US012767795B2

(12) United States Patent
Jiang et al.

(10) Patent No.: US 12,767,795 B2
(45) Date of Patent: Oct. 20, 2026

(54) FLUOROPOLYMER SHEAR-THINNING INKS AND METHODS OF MAKING AND USING SAME

(71) Applicant: The Johns Hopkins University, Baltimore, MD (US)

(72) Inventors: Zhouran Jiang, Baltimore, MD (US); Devina Chatterjee, Baltimore, MD (US); Galip Ozan Erol, Baltimore, MD (US); David H. Gracias, Baltimore, MD (US); Sung Hoon Kang, Baltimore, MD (US); Lewis Romer, Baltimore, MD (US); Narutoshi Hibino, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 534 days.

(21) Appl. No.: 17/604,648

(22) PCT Filed: Apr. 19, 2020

(86) PCT No.: PCT/US2020/028898
§ 371 (c)(1),
(2) Date: Oct. 18, 2021

(87) PCT Pub. No.: WO2020/215047
PCT Pub. Date: Oct. 22, 2020

(65) Prior Publication Data

US 2022/0186055 A1 Jun. 16, 2022

Related U.S. Application Data

(60) Provisional application No. 62/835,876, filed on Apr. 18, 2019.

(51) Int. Cl.
*C08L 5/00* (2006.01)
*C08L 27/18* (2006.01)
*B33Y 70/00* (2020.01)

(52) U.S. Cl.
CPC ................. *C08L 5/00* (2013.01); *C08L 27/18* (2013.01); *B33Y 70/00* (2014.12); *C08L 2203/02* (2013.01)

(58) Field of Classification Search
CPC ........ C08L 5/00; C08L 27/18; C08L 2203/02; B33Y 70/00

(Continued)

(56) References Cited

U.S. PATENT DOCUMENTS 10,428,248 B1 * 10/2019 Wolf ..................... C08L 31/04
2001/0018464 A1 * 8/2001 Fujita ..................... A61L 27/20
521/84.1

(Continued)

FOREIGN PATENT DOCUMENTS

WO WO 2017/014784 1/2017
WO WO 2020/215047 10/2020

OTHER PUBLICATIONS

Nonoxynol-12 (Year: 1989).*
International Search Report and Written Opinion for PCT/US2020/028898. Mailed Apr. 18, 2019. 6 pages.

*Primary Examiner* — Betelhem Shewareged
(74) *Attorney, Agent, or Firm* — Casimir Jones, S.C.; Jeffrey W. Childers; Tristan A. Fuierer

(57) ABSTRACT

Provided are compositions (which may inks), methods, devices, and systems that are used with 3D printing. The compositions contain fluoropolymer particles, one or more type of a medium, one or more surfactants, and one or more shear thinning agents. The fluoropolymer component can be one or more of polytetrafluoroethylene (PTFE), perfluoroalkoxy, fluorinated ethylene-propylene, and poly ethyl (Continued)

enetetrafluoroethylene. Cartridges that contain the compositions are also provided. Methods of making the compositions, methods of using the compositions for 3D printing, and articles of manufacture, such as medical devices, are also provided.

24 Claims, 19 Drawing Sheets

(58) Field of Classification Search
USPC .......................................................... 428/32.1
See application file for complete search history.

(56) References Cited

U.S. PATENT DOCUMENTS

| | | | | |
|---|---|---|---|---|
| 2007/0265161 | A1* | 11/2007 | Gadkaree ............... | B01D 53/02<br>502/417 |
| 2015/0134096 | A1* | 5/2015 | Travers ................. | B29C 64/386<br>700/98 |
| 2017/0204313 | A1* | 7/2017 | Karunakaran ........... | C09D 4/06 |
| 2017/0253751 | A1 | 9/2017 | Busbee et al. | |
| 2022/0186055 | A1* | 6/2022 | Jiang ......................... | A61F 2/06 |

* cited by examiner

Tubular propeller

Aortic valve a

FLUOROPOLYMER SHEAR-THINNING INKS AND METHODS OF MAKING AND USING SAME

CROSS REFERENCE TO RELATED APPLICATIONS

This application is a § 371 National Entry Applications of PCT/US2020/028898, filed Apr. 19, 2020, which claims priority to U.S. provisional application No. 62/835,876, filed Apr. 18, 2019, each of which is incorporated herein by reference.

STATEMENT REGARDING FEDERALLY SPONSORED RESEARCH

This invention was made with government support under grant HD090663 awarded by the National Institutes of Health. The government has certain rights in the invention.

BACKGROUND OF THE DISCLOSURE

Polytetrafluoroethylene (PTFE) is a revolutionary fluoropolymer with excellent properties such as high thermal, chemical and wear resistance, high anti-stiction properties, hydrophobicity and fracture toughness, and low coefficient of friction. Since its accidental discovery in 1938, PTFE has been widely used in many areas including in household non-stick cookware, low friction ball bearings, pharmaceutical and biotechnology processing equipment, subcutaneous implants, and coaxial cables in aerospace applications. The annual worldwide PTFE production is approximately 200,000 tons and is expected to rise in the following decade.

Despite, the importance of this material, PTFE parts cannot be structured from its molten state due to its high melt viscosity, high melting temperature and potential for decomposition. Hence, most of the conventional manufacturing methods used for thermoplastic materials including injection molding cannot be used for PTFE processing. To overcome these major limitations, fabrication techniques have been developed that are based upon powdered compaction of ceramics and metals followed by sintering, machining, and paste-extrusion. However, these processes have high fabrication costs due to the need for custom tooling to manufacture parts (dies and molds). These form-restrictive and slow processes directly impact design complexity, and certain designs are either impractical or not even possible to fabricate. Besides, the existing processes for PTFE also create large volumes of non-recyclable waste, and this adds to the high manufacturing costs of PTFE articles.

In the last decade, additive manufacturing (AM) has emerged as an important technology due to its ability to create complex and customizable shapes in a rapid manner. Widely used AM methods include fused filament fabrication (FFF), stereolithography (SLA), and direct ink writing (DIW) and they have been utilized in a variety of applications ranging from biomedical implants to soft robotics. While many thermoplastics, metals, and resins can be used in AM approaches, there are significant limitations to the use of PTFE and other fluoropolymers such as perfluoroalkoxy (PFA) and fluorinated ethylene-propylene (FEP). For example, PTFE's high melt viscosity makes it impossible to melt and extrude the material for 3D-printing by FFF. SLA has been employed as an alternative to FFF to 3D-print PTFE parts in recent years. For example, is has been reported that a photocurable PTFE colloidal mixture that can be used with SLA printing, and the developed process was able to fabricate PTFE microstructures after sintering. A SLA 3D-printing process of PTFE has also been described. However, the sizes of the 3D-printed structures and the resulting properties were limited due to small curing areas during printing by SLA. This small curing area issue also increases printing time for larger structures, making the fabrication of PTFE parts a time-consuming process.

Based on the foregoing, there exists an ongoing and unmet need for improved fluoropolymer-based inks and methods of using such inks for additive manufacturing. The present disclosure is pertinent to this need.

SUMMARY OF THE DISCLOSURE

The disclosure provides compositions, methods, devices, and systems that pertain to 3D printing. Methods of making the compositions, and methods of making three dimensional articles of manufacture using the compositions are provided.

In embodiments, the disclosure provides compositions, which may be provided as an ink, the compositions comprising fluoropolymer particles, including but not necessarily limited to PTFE, perfluoroalkoxy, fluorinated ethylene-propylene, polyethylenetetrafluoroethylene, and the like, and combinations thereof. In embodiments, the compositions comprising the fluoropolymer particles include one or more medium, one or more surfactant, and one or more shear thinning agent. Compositions of the disclosure can comprise or consist of any combination of components described herein.

In embodiments, a composition of the disclosure comprises a shear thinning agent that is at least one of gellan gum, xanthan gum, agar, laponite. Combinations of two or more of these components are included in the disclosure. In embodiments, a composition of this disclosure has shear thinning agent wt. % of 0.1 to 80, inclusive, and including all numbers and ranges of numbers therebetween to the first decimal point. In a non-limiting embodiment, a composition of the disclosure has a fluoropolymer wt. % of 10 to 90 inclusive, and including all numbers and ranges of numbers therebetween to the first decimal point. In embodiments, a composition of the disclosure includes fluoropolymer particles that have a size (e.g., a longest linear dimension, such as, for example, diameter) of 10 nm to 100 microns, inclusive, and including all numbers and ranges of numbers therebetween to the first decimal point. In embodiments, a composition of this disclosure is suitable for 3D printing. Weight percent refers to the total amount of all components in the composition.

In embodiments, the disclosure provides methods of making the compositions described herein. In embodiments, a method comprises heating (e.g., heating to approximately 50° C.), the fluoropolymer particles and a suitable medium, which may be in the form of a dispersion, contacting a shear thinning agent (e.g., mixing) with the heated fluoropolymer medium mixture, which may be a dispersion, while stirring to form a mixture, and, optionally, stirring the mixture (e.g., stirring at 500 to 4000 RPM, including every integer RPM value and range therebetween (e.g., 3000 RPM) for a period of time, such as from 30 seconds to 5 minutes, including every integer second value and range therebetween (e.g., 90 seconds), which may be performed at least twice or only twice, using any suitable device. In embodiments, a stirring step is performed using a planetary mixer or through magnetic stirring (e.g., through a magnetic stir plate and a magnetic stir bar)).

In embodiments, the disclosure includes a cartridge that includes a composition of the disclosure. In embodiments, the cartridge is adapted to be heated or cooled to a desired temperature, non-limiting examples of which include 4° C. to 100° C., inclusive, and including all integers and ranges of integers therebetween.

In an embodiment, the disclosure provides a method of producing a three dimensional structure using a composition described herein. In embodiments, the method comprises printing the three dimensional structure with the composition that may be, for example, loaded into a suitable cartridge. The cartridge is adapted for use with a suitable 3D printer which may include, for example, any suitable nozzle, such as a plastic or metal nozzle that may be an 18 G nozzle. The three dimensional structure is made using a pressure necessary to dispense the ink (e.g., a pressure varying from 10-500 kPa) at appropriate speeds (e.g., 5 mm/s to 50 mm/s). The three dimensional structure may be thermally treated. In embodiments, the thermal treatment comprises adjusting (e.g., heating) the interior temperature (which may be measured) inside of a vessel containing the three dimensional structure to a first temperature (e.g., 225° C. to 300° C. during a first period of time (e.g., 30 min to 10 hours); maintaining the first temperature for a second period of time (e.g., 30 min-10 hours); adjusting the interior temperature measured inside of the vessel containing the three dimensional structure (e.g., heating) to a second temperature (e.g., 225-450° C.) during a second period of time (e.g., 30 min to 10 hours); maintaining the second temperature for a third period of time (e.g., 30 min-10 hours); and adjusting the interior temperature measured inside of the vessel containing the three dimensional structure (e.g., cooling) to a third temperature during a fourth period of time (e.g., 30 min to 10 hours). In an embodiment, the thermal treating includes adjusting (e.g., heating) the interior temperature measured inside of a vessel containing the three dimensional structure to a first temperature (e.g., 225° C. to 300° C.) during a first period of time (e.g., 30 min to 10 hours); maintaining the first temperature for a second period of time (e.g., 225° C. to 450° C.); and adjusting (e.g., cooling) the interior temperature measured inside of the vessel containing the three dimensional structure to a second temperature (e.g., 225-450° C.) during a third period of time (e.g., 30 min to 10 hours). Any temperature adjustment of the disclosure may be performed at a suitable rate, such as 1-200° C./hr, inclusive, and include all 0.1° C./hr values and ranges therebetween.

In embodiments, the disclosure provides an article of manufacture comprising PTFE and/or fluoropolymer derivatives that are described herein. In embodiments, the article of manufacture comprises a medical device, including but not limited to an implantable medical device, which may include any vascular implant, blood vessel, tissue scaffolding, and the like. In embodiments, the article of manufacture comprises an implantable valve, such as a valve that can be implanted into any vein or artery (e.g., a vascular implant, such as, for example, a bicuspid aortic valve). In alternative embodiments, the article of manufacture is an aerospace component, such as any part or component that is used or intended for use in any aircraft, orbiting device, or projectile, including but not necessarily limited to missiles and rockets.

BRIEF DESCRIPTION OF THE FIGURES

For a fuller understanding of the nature and objects of the disclosure, reference should be made to the following detailed description taken in conjunction with the accompanying figures.

DETAILED DESCRIPTION OF THE DISCLOSURE

Figure 1:
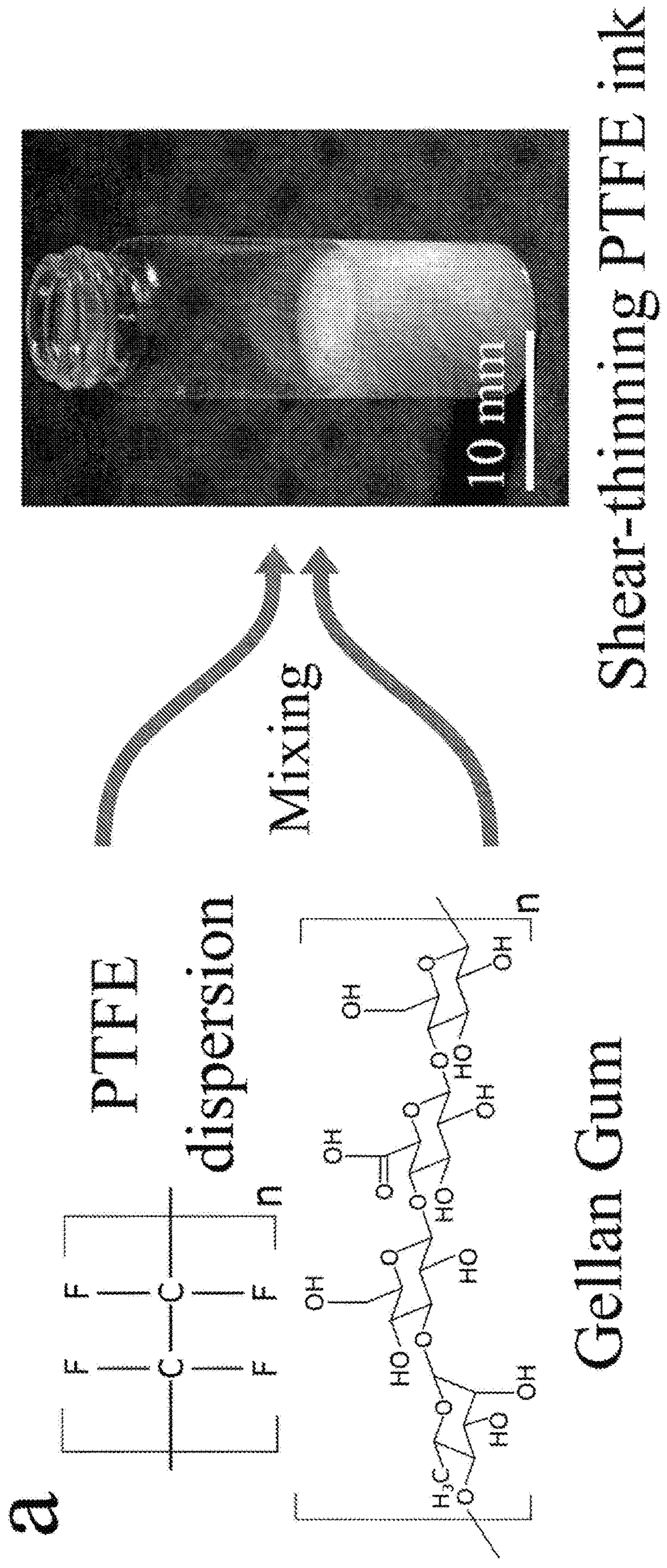
FIG. 1. Schematics of molecular structure and processes developed to 3D-print PTFE structures. (a) Schematic showing the molecular structure of the PTFE dispersion and GG, and process used to make the shear-thinning ink for DIW along with the microstructure and a photograph of the ink. (b) Schematic showing the two-step fabrication process that is used to 3D-print PTFE structures, that combines DIW and thermal treatment.
Figure 1:
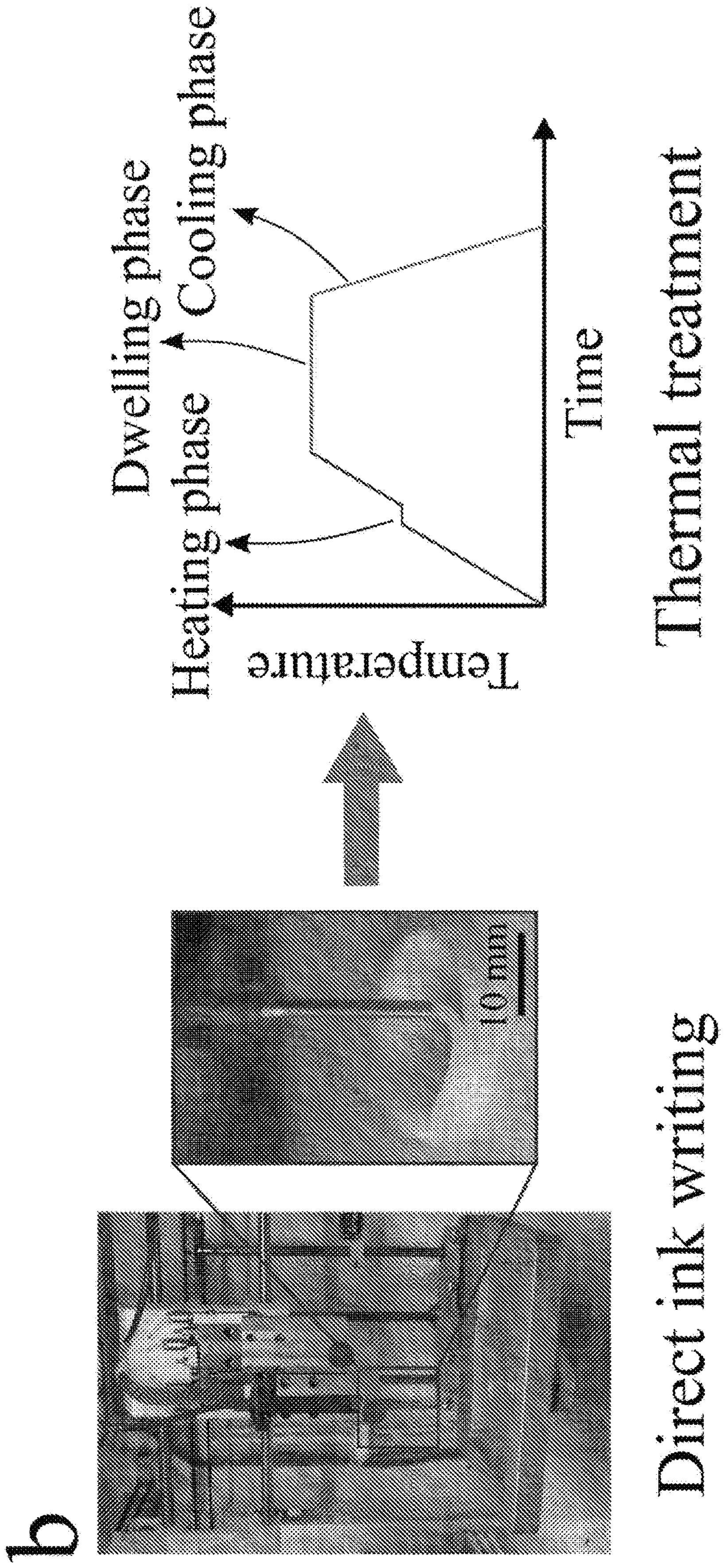

Although the subject matter of the present disclosure will be described in terms of certain examples, other examples, including examples that do not provide all of the benefits and features set forth herein, are also within the scope of this disclosure. Various structural, logical, and process step changes may be made without departing from the scope of the disclosure.

Ranges of values are disclosed herein. The ranges set out a lower limit value and an upper limit value. Unless otherwise stated, the ranges include all values to the magnitude of the smallest value (either lower limit value or upper limit value) and ranges between the values of the stated range.

The present disclosure provides compositions comprising fluoropolymer (e.g., polytetrafluoroethylene (PTFE)) particles. The present disclosure also provides methods of making and using the compositions.

In an aspect, the present disclosure provides compositions, which may be referred to as inks. The compositions comprise fluoropolymer particles, a medium, a surfactant, and a shear thinning agent. In addition, additives such as, for example, nanoparticles and/or fillers may be added. In an example, compositions of the present disclosure are suitable for 2D printing, 3D printing, and 4D printing.

Various fluoropolymer particles may be used. Examples of such fluoropolymer particles may be, for example, various PTFE particles and particle-based fluoropolymers (e.g., perfluoroalkoxy, fluorinated ethylene-propylene, polyethylenetetrafluoroethylene, and the like, and combinations thereof). In an example, a fluoropolymer particle (e.g., PTFE particle) has a size (e.g., a longest linear dimension, such as, for example, a diameter) of 10 nm to 1000 microns, including all integer nanometer values and ranges therebetween. In another example, the fluoropolymer particle (e.g., PTFE particle) has a size (e.g., a longest linear dimension, such as, for example, a diameter) of 10 nm to 1000 nm. The fluoropolymer particles (e.g., PTFE particles) may be provided in a dispersion. A fluoropolymer particle (e.g., PTFE particle) may have a molecular weight (e.g., an Mn) of 103 to 107, including every integer value and range therebetween. In an example, a PTFE dispersion is commercially available. Such a dispersion is a 60 wt. % PTFE dispersion in a medium or a mixture of media and/or surfactants (e.g., water, Poly(oxy-1, 2-ethanediyl), α[3,5-dimethyl-1-(2-methylpropyl)hexyl]-ω-hydroxy). Such dispersions may further comprise one or more surfactants (e.g., polyoxyethylene(12)nonylphenyl ether; polyoxyethylene(150)dinonylphenyl ether; Poly(oxy-1,2-ethanediyl), α-(nonylphenyl)-ω-hydroxy-; Triton X-100; Surfynol 440; and the like; and combinations thereof). A surfactant may be ionic or non-ionic. The composition may comprise 10 to 90 wt. % fluoropolymer particle (e.g., PTFE particle), including every 0.1 wt. % value and range therebetween (e.g., 55 to 75 wt. % or 55 to 65 wt. % or 59 to 60 wt. % or 59.1 to 59.7 wt. %). The wt. % may be the wt. % relative to the weight of the total composition.

Various shear thinning agents can be used. One shear thinning agent or a combination two or more shear thinning agents may be used. Without intending to be bound by any particular theory, it is considered a sheer thinning agent is used to provide desirable shear thinning properties of the composition when used in 3D printing techniques, such as, for example, direct ink writing (DIW). Non-limiting examples of shear thinning agents include gellan gum, xanthan gum, agar, laponite, and the like, and combinations thereof. A composition may comprise 0.1 to 80 wt. % sheer thinning agent, including every 0.01 wt. % value and range therebetween. In an example, a shear thinning agent (e.g., gellan gum) is present in the composition at 0.25 to 2.0 wt. %. In another example, the shear thinning agent is present in the composition at 0.5 to 1.5 wt. %. The wt. % may be the wt. % relative to the weight of the total composition.

Various media may be used in the composition. Non-limiting examples of media include water, ethylene glycol, alcohols (e.g., methanol, ethanol, propanol, isopropanol, and the like). A single medium may be used or a mixture of media may be used. The composition may comprise 20 to 50 wt. % medium, including every 0.1 wt. % value and range therebetween. In an example, the composition comprises 39 to 40 wt. % medium (e.g., 39.4 to 39.8 wt. %). The wt. % may be the wt. % relative to the weight of the total composition.

Various surfactants may be used. One or more surfactant may be present from a commercially available dispersion of fluoropolymer particles (e.g., PTFE particles). The surfactant may be ionic or non-ionic. A single surfactant may be used or a combination of surfactants may be used. Non-limiting examples of surfactants include polyoxyethylene (12)nonylphenyl ether, polyoxyethylene(150)dinonylphenyl ether; Poly(oxy-1,2-ethanediyl), .α-(nonylphenyl)-ω-hydroxy-; Triton X-100; Surfynol 440; and the like; and combinations thereof. The composition may comprise 3 to 15 wt. % surfactant, including every 0.1 wt. % value and range therebetween. In an example, a composition comprises 5 to 9 wt. % surfactant. The wt. % may be the wt. % relative to the weight of the total composition.

Compositions may further comprise additional components. The additional components are non-fluoropolymer particles (e.g., non-PTFE particles). Compositions comprising additional components may be used to make composite objects having additional functionalities (e.g., a composite object may be, for example, magnetic because of an additional component). Various examples of additional particles include, such as, for example, magnetic particles, carbon nanotubes, carbon fibers, Kevlar fibers, glass fibers, bronze particles, silica nanoparticles, aluminum oxide, ceramic particles, iron oxide, graphene or graphene oxide flakes, and the like, and combinations thereof. Materials that melt/decompose at temperatures lower than fluoropolymers particles (e.g., PTFE particles) may be incompatible with a composition of the present disclosure.

Compositions of the present disclosure may have desirable rheological and shear-thinning properties. For example, compositions of the present disclosure exhibit shear-thinning behavior. Compositions also have a storage modulus (G') at a first shear stress such that they exhibit solid-like properties and a loss modulus (G") resulting in liquid-like viscoelastic properties at shear stress higher than the first shear stress. In an example, G' crosses over G" and/or recovers after extrusion, such that the shape of the extruded object is retained. That is, in this example, during extrusion G" is higher than G", but after extrusion G' is higher than G".

In an aspect, the present disclosure provides methods of making compositions described herein. The methods are based on heating and mixing the components of the composition described herein. A method may be used to make a composition of the present disclosure.

For example, the composition is prepared by heating fluoropolymer particles (e.g., PTFE particles) and one or more medium (e.g., water) (e.g., heating up to 50° C. or less (e.g., room temperature to 50° C., including every 0.1° C. value and range therebetween)); mixing the sheer thinning agent (e.g., gellan gum) with the heated fluoropolymer particles in the medium while stirring to form a mixture; and stirring the mixture (e.g., stirring at 500 to 4000 RPM, including every integer RPM value and range therebetween (e.g., 3000 RPM) for 30 seconds to 5 minutes, including every integer second value and range therebetween (e.g., 90 seconds) twice in a planetary mixer or through magnetic stirring (e.g., through a magnetic stir plate and a magnetic stir bar)).

In an aspect, the present disclosure provides methods of using the compositions described herein. The methods are based on thermal treatment of the objects formed from a composition made using direct ink writing (DIW) techniques. The objects may be three dimensional structures.

As used herein, the term "direct ink writing" and "DIW" refers to an additive manufacturing technique. DIW is also known as robocasting.

The objects may be referred to as printed structures. In an example, the compositions of the present disclosure are used in 2D printing, 3D printing, or both.

In an example, the method of producing an object (e.g., a three dimensional structure) using a composition of the present disclosure comprises: i) printing (e.g., printing through DIW) an object with the composition (e.g., the composition loaded into, for example, a cartridge suitable for use in a 3D printer) using a 3D printer (e.g., a 3D printer having an 18 G nozzle) at a pressure necessary to dispense the ink (e.g., a pressure varying from 10-140 kPa); and ii) thermally treating the three dimensional structure. Cartridges suitable for use in 3D printers are known in the art and are commercially available.

In an example, thermal treating comprises: adjusting the interior temperature (e.g., heating) measured inside of a vessel containing the three dimensional structure to a first temperature (e.g., 225° C. to 300° C.) during a first period of time (e.g., 30 minutes to 10 hrs); maintaining the first temperature for a second period of time (e.g., 30 minutes to 10 hrs); adjusting the interior temperature (e.g., heating) measured inside of the vessel containing the three dimensional structure to a second temperature (e.g., 225 to 450° C.) during a second period of time (e.g., 30 minutes to 10 hours); maintaining the second temperature for a third period of time (e.g., 30 minutes to 10 hours); and adjusting the interior temperature (e.g., cooling) measured inside of the vessel containing the three dimensional structure to a third temperature during a fourth period of time (e.g., 30 minutes to 10 hours). The various times and temperatures may change on the grade of fluoropolymer particles (e.g., PTFE particles) used.

In another example, thermal treating comprises adjusting (e.g., heating) the interior temperature measured inside of a vessel containing the three dimensional structure to 5 a first temperature (e.g., 250° C. to 300° C.) during a first period of time (e.g., 30 min to 10 hours); maintaining the first temperature for a second period of time (e.g., 30 min to 10 hours); and adjusting (e.g., cooling) the interior temperature measured inside of the vessel containing the three dimensional structure to a second temperature (e.g., 225 to 450° C.) during a third period of time (e.g., 30 min to 10 hours).

Thermal treating may comprise further multiple points at which a temperature is maintained for various lengths of times. These points may be referred to as dwelling phases. The thermal treating may also comprise various heating rates. When adjusting (e.g., heating or cooling) the temperature in a method of the present disclosure, the temperature may be adjusted at a constant rate, such as, for example, of 1-200° C./hr, including every integer ° C./hr value and range therebetween.

Without intending to be bound by any particular theory, it is considered adjusting the thermal treatment parameters (e.g., cooling rate, maximum temperatures, and the like) affects the mechanical properties of the resulting printed object. For example, changing or modifying the thermal treatment parameters may result in a different Young's modulus, yield strength, and/or ultimate tensile strength. Parameters of the thermal treatment can further be modified/tune to adjust other features such as porosity. For example, higher temperatures (e.g., 420° C.) produce objects with a higher Young's modulus, while lower temperatures (e.g., 340° C.) produce objects with a lower Young's modulus.

An object produced by the thermal treatment may have a fibrillated 25 microstructure or a porous microstructure. A fibrillated microstructure may consist of several fibril-like fluoropolymer (e.g., PTFE) structures that are fused together. The directions of the fluoropolymer (e.g., PTFE) fibrils can be organized or random. Porous microstructure consists of pores in different sizes and shapes formed within the fluoropolymer (e.g., PTFE) structures. The changes in Young's modulus is attributed to the amount of fibrillation and/or pores. For example, porous microstructures result in lower Young's modulus, while a fibrillated and more uniformly fused microstructure results in higher Young's modulus.

Objects produced from the methods of the present disclosure may be of high complexity because of the properties imbued by the compositions (e.g., inks) and/or methods described herein as well as customizable designs. Objects having high complexity may be used for multiple applications, such as, for example, shape changing implants, valves, soft robotics, adaptive structures, and the like, and combinations thereof.

The steps of the methods described in the various examples disclosed herein are sufficient to carry out methods of the present disclosure. Thus, in an example, a method consists essentially of a combination of the steps of the methods disclosed herein. In another example, a method consists of such steps.

In an aspect, the present disclosure provides articles of manufacture. The articles of manufacture may be made from a method described herein.

In an example, articles of manufacture are hydrophobic and have a desirable water contact angle. For example, the water contact angle is greater than 110°. In another example, the water contact angle is 1100 to less than 180°, including every 0.10 value and range therebetween. The contact angle may depend on the roughness of the surface. Contact angles may be increased by 3D printing certain surface architectures. One or more surface properties may be adjusted and/or selected to provide (e.g., tune) a desired contact angle to suit a specific purpose, such as, for example, staining, biofouling, protein adsorption, water repellent coatings, and the like, and combinations thereof.

Articles of manufacture may be produced using the methods described herein. Non-limiting examples of articles of manufacture include medical devices (e.g., vascular implants, such as, for example, a bicuspid aortic valve), aerospace components (e.g., dielectric cables), fluidics (e.g., pipes), propellers (e.g., tubular propellers), low friction bearings, gears, filters, dental fillings, electronic cables (e.g., insulators), and active shape change devices.

An article of manufacture may be a composite. Such composites include, but are not limited to, articles having magnetic particles, carbon nanotubes, carbon fibers, Kevlar fibers, glass fibers, bronze particles, silica nanoparticles, aluminum oxide, ceramic particles, iron oxide, graphene or graphene oxide flakes, or the like, or a combination thereof.

The following example is presented to illustrate the present disclosure. It is not intended to be limiting in any way.

Example 1

This example provides a description of compositions of the present disclosure and methods of making and using same.

Additive manufacturing techniques such as fused filament fabrication (FFF) and direct ink writing (DIW) promise to revolutionize fabrication of parts by facilitating rapid prototyping, customization, and unparalleled design freedom. Polytetrafluoroethylene (PTFE) is a unique polymer with highly desirable properties such as resistance to chemical degradation, biocompatibility, hydrophobicity, anti-stiction, and low friction coefficient. However, due to its high melting temperature, potential for decomposition and high melt viscosity, it has been very challenging to 3D-print PTFE structures. Here, we report a versatile strategy to 3D-print PTFE structures with tunable mechanical properties, by utilizing a newly developed ink and thermal treatment process. The ink was formulated by mixing PTFE particles with a binding gum to optimize shear thinning properties required for DIW. We developed a multistage thermal treatment to fuse the PTFE particles and to solidify the printed structures. We have characterized the rheological and mechanical properties, and processing parameters of these structures using statistical design-of-experiments followed by imaging and mechanical testing. Importantly, several of the mechanical and structural properties of the final printed PTFE structures resemble that of compression molded PTFE. We anticipate that this versatile approach facilitates production of 3D-printed PTFE components with applications in engineering and medicine.

This disclosure provides a new and versatile fabrication process for 3D-printing complex PTFE structures using DIW followed by a thermal treatment (FIG. 1). DIW, also called robocasting, is one of the AM methods in which gel-like materials with unique rheological properties are printed layer-by-layer using an x-y-z position controlled syringe. Two important challenges in DIW are the need for inks that have shear-thinning characteristics, i.e., low viscosity during extrusion but high viscosity after printing and sufficiently-high viscoelastic yield stress so that after extrusion the material is self-supporting like an elastic solid. Hence, a challenge that needed to be overcome in arriving at the present disclosure was to create shear-thinning PTFE ink (FIG. 1*a*). We analyzed whether a mixture of rigid micron-sized PTFE particles with a viscoelastic gum would exhibit shear-thinning properties while being able to retain its shape after extrusion. We evaluated different formulations of shear-thinning PTFE inks using a variety of commercially available natural gums including Gellan Gum (GG), Xanthan Gum and Agar. We evaluated formulations with the lowest gum concentration so that the resulting 3D-printed structures could approach high levels of purity for PTFE. We selected GG, a water-soluble anionic polysaccharide, due to its ability to form shear-thinning gels at lower concentrations compared to other gums considered. In the presently described inks, GG also functions as a binding agent to carry PTFE particles during 3D-printing while providing the required shear thinning rheological properties. Further, we analyzed whether additives such as the surfactants in the PTFE dispersion, gellan gum, and water, in the 3D-printed structures could be removed with a thermal treatment while PTFE particles coalesced and fused to form the final structure (Figure Tb). Hence, the present disclosure provides in embodiments a multistage thermal treatment to solidify the structures printed with the described PTFE inks. Additional description of the ink and the thermal treatment process is provided below.

Figure 2:
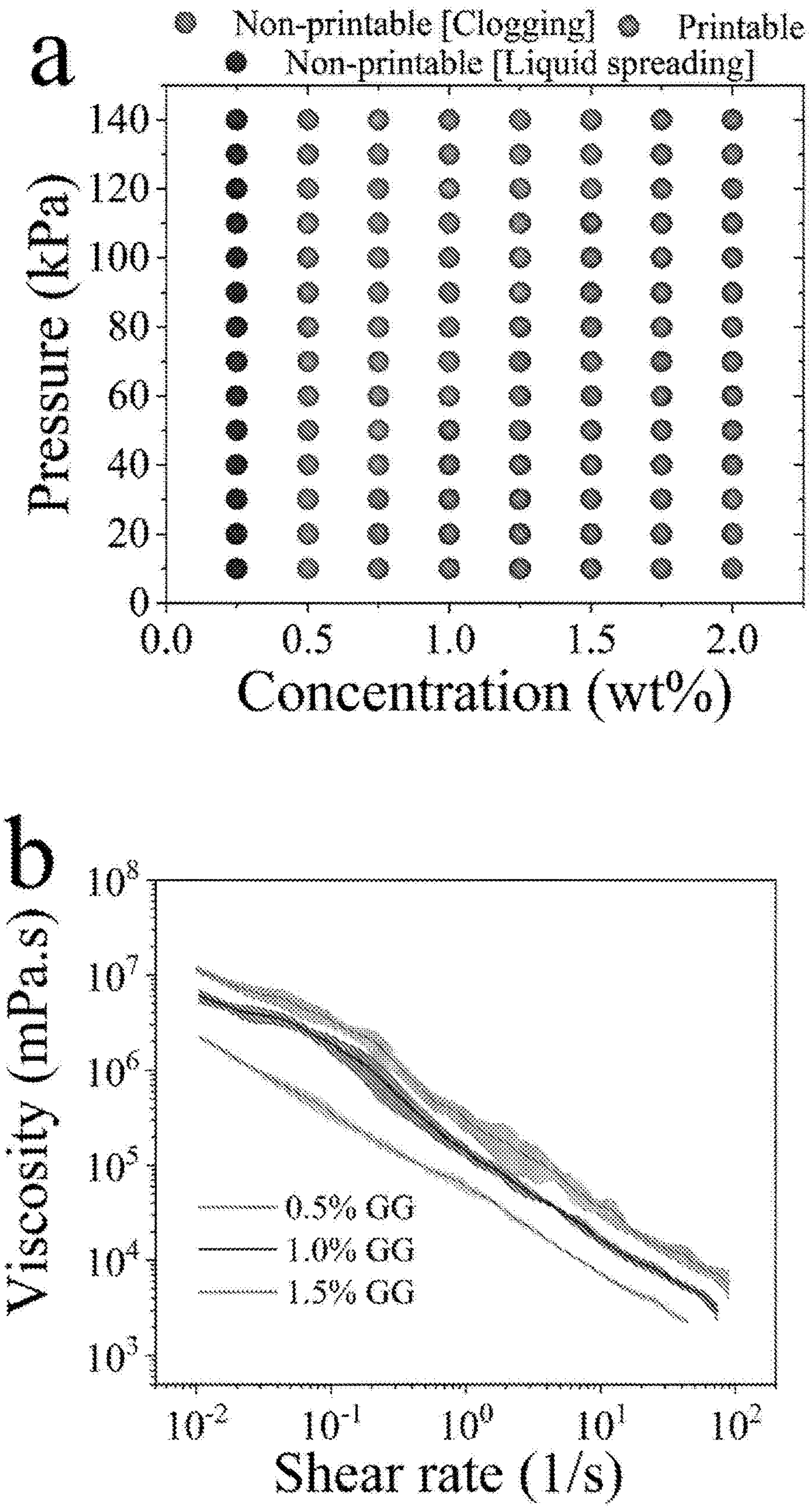
FIG. 2. Characterization of the rheological and viscoelastic properties of the shear-thinning PTFE inks. (a) Graph showing printable ranges of the inks as a function of $C_{GG}$ and extrusion pressure. The group of dots in the box are "non-printable [clogging]." (b) Graph showing the viscosity of the PTFE inks as a function of shear rate. (c) Plots of the storage and loss modulus of the PTFE inks as a function of shear stress.
Figure 2:
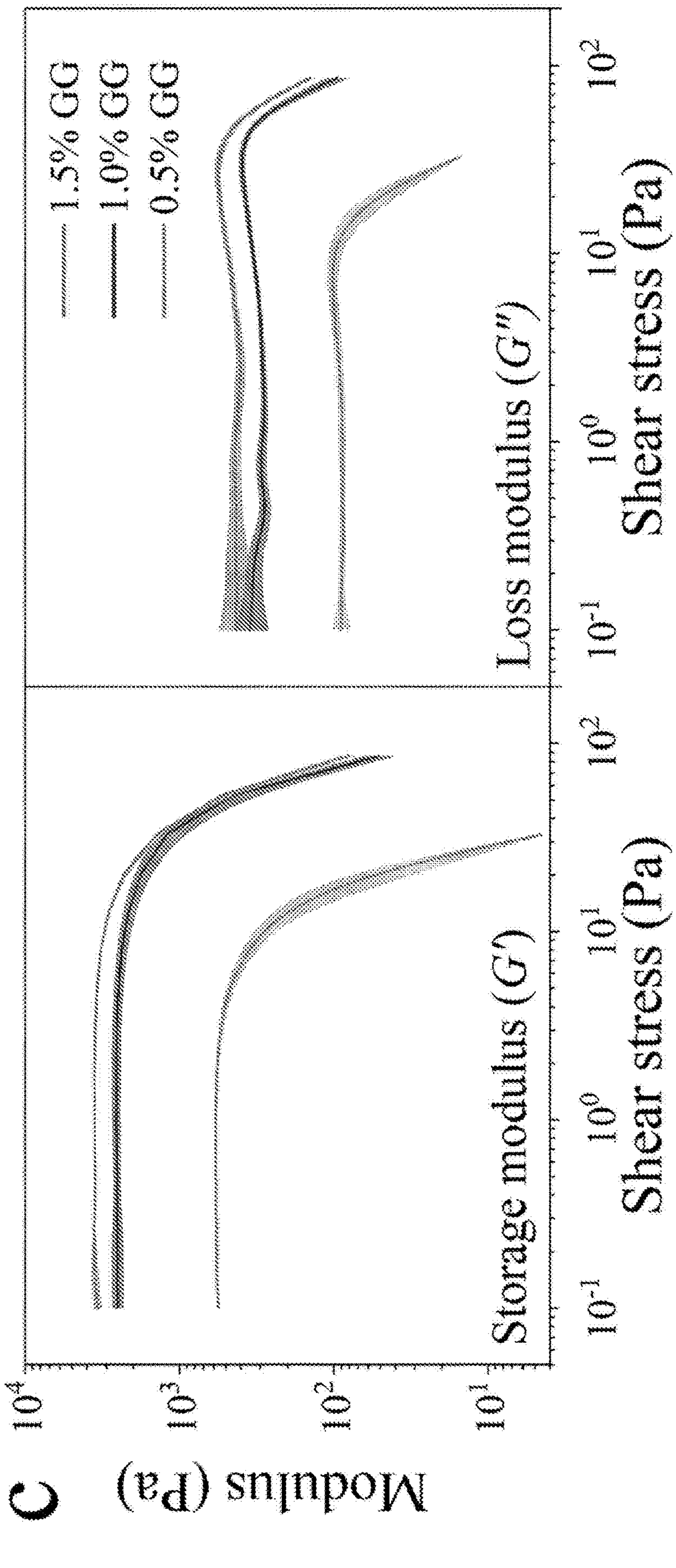
Figure 6:
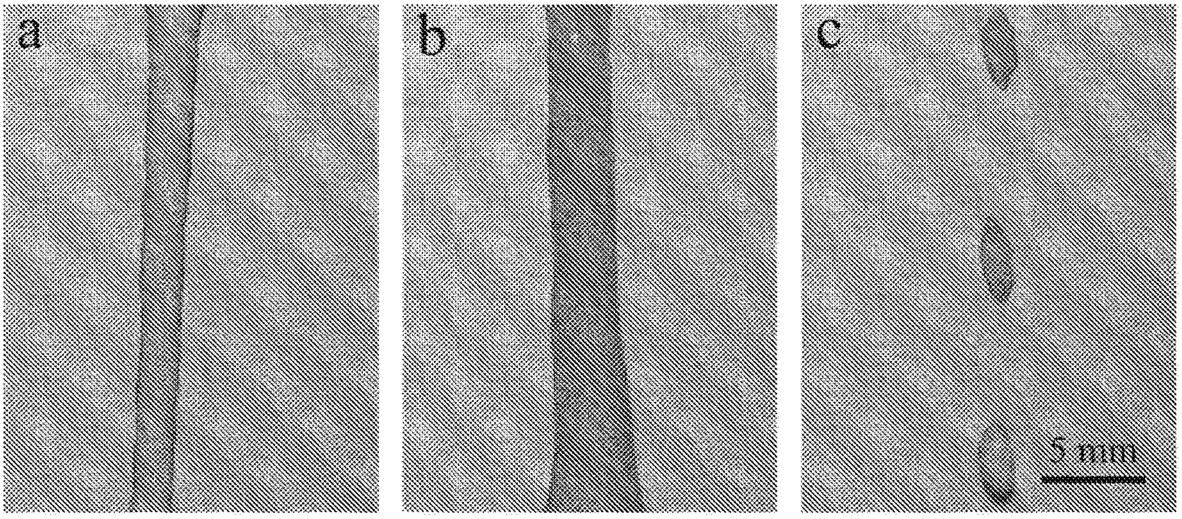
FIG. 6. Printability of the PTFE ink formulations. (a) Photograph of straight lines printed using PTFE inks with GG concentrations between 0.5% and 1.5%. (b) Photograph of straight lines printed with GG concentrations below 0.5%. (c) Photograph of straight lines printed with GG concentrations above 1.5%.

We analyzed the printability and viscoelastic properties of various ink compositions with PTFE particles and GG (See Note S1). The printability of the inks was determined by printing test lines approximately 30 mm long while varying the extrusion pressure between 10 kPa and 140 kPa, and the GG weight concentration in the inks from 0.25% to 2.0%. We used a printing nozzle diameter of 0.8 mm in these experiments. We observed that inks with GG concentrations between 0.5% and 1.5% were printable as these inks were able to retain their shape right after extrusion. Lines printed with inks with GG concentrations below 0.5% spread out and could not retain their shape. Alternatively, inks with GG concentrations above 1.5% showed high gelation and clogging of the nozzle, resulting in discontinuous printing (FIG. 6). Using such approaches, we were able to create a chart of feasible GG concentrations and pressure ranges for printing (FIG. 2*a*). We next characterized the viscosity and viscoelastic properties of the feasible ink compositions. FIG. 2*b* shows the viscosity change of the inks as a function of the shear rate applied. All the PTFE inks with GG exhibited a shear-thinning behavior as seen by their decrease in viscosity with increasing shear rate. Further, inks with higher GG concentrations showed higher viscosity values across the range of shear rates.

We also characterized the oscillatory shear rheology of the inks to determine their viscoelastic properties (FIG. 2*c*). This behavior is important in DIW since the inks should have a high storage modulus (G') at low shear stresses such that they exhibit solid-like properties after printing and retain their printed shape. In addition, the loss modulus (G") should be higher compared to G' at high shear stresses so that they show liquid-like properties during extrusion through the printing nozzle. We observed that all the ink compositions exhibited high G' values at lower shear stresses and high G" at high shear stresses. These results suggest that all three of these ink formulations are printable.

With regards to the processing steps after printing, the non-PTFE additives in the inks including water, surfactants, and GG should be removed to obtain pure PTFE printed parts, and to ensure the mechanical integrity of the final structures through the coalescence of the PTFE particles. We analyzed whether applying a thermal treatment similar to PTFE fabrication processes such as compaction molding would remove these additives while densifying the printed structures (Note S2). Even though thermal processing conditions used in compaction molding for PTFE are known, the disclosure includes identification of the effects of these processing parameters on the 3D-printed structures while simultaneously evaluating their impact on the mechanical properties. We analyzed thermal degradation of the materials used in the inks using thermogravimetric analysis (TGA) to ensure that the additives could be removed using a thermal treatment (FIG. 7*a*). We conducted TGA of the PTFE dispersion, pure GG, and the PTFE ink with 1.5% GG concentration. Pure GG exhibited a large mass loss at approximately 250° C. Pure PTFE particles exhibited a mass loss around 550° C. which is due to known decomposition of PTFE to form carbonyl fluoride, hydrogen fluoride and tetrafluoroethylene. For the PTFE ink with 1.5% GG, we observed that there was an initial mass loss until 120° C. which we attributed to the evaporation of water and surfactants followed by additional significant mass loss around 550° C. that was similar to the mass loss seen with pure PTFE particles. We attribute the absence of a peak corresponding to GG at about 250° C. to its very low concentration in the mixture.

We utilized a Taguchi design-of-experiments approach (DOE) to quantify the possible effects of the processing conditions on the mechanical and surface properties. The DOE utilizes specifically designed orthogonal arrays to statistically quantify the effects of process parameters on desired responses. We considered three parameters: maximum temperature reached during thermal treatment ($T_{max}$), cooling rate (CR) and GG concentration ($C_{GG}$). We analyzed whether $T_{max}$ is an important parameter since both densification and fusion of the PTFE particles are highly dependent on this temperature. We included CR as a parameter due to its effects on the crystallinity characteristics as PTFE solidifies from its molten state. We also included $C_{GG}$ as a parameter since the concentration can affect the microstructure of the 3D-printed structures leading to different mechanical properties. We investigated the effects of the parameters at three different levels using the L9 orthogonal array which includes nonlinear effects (Tables S1 and S2). Young's modulus, yield strength, and water contact angle were chosen as the desired responses for the DOE study (See Note S2 for the application of Taguchi method).

Figure 3:
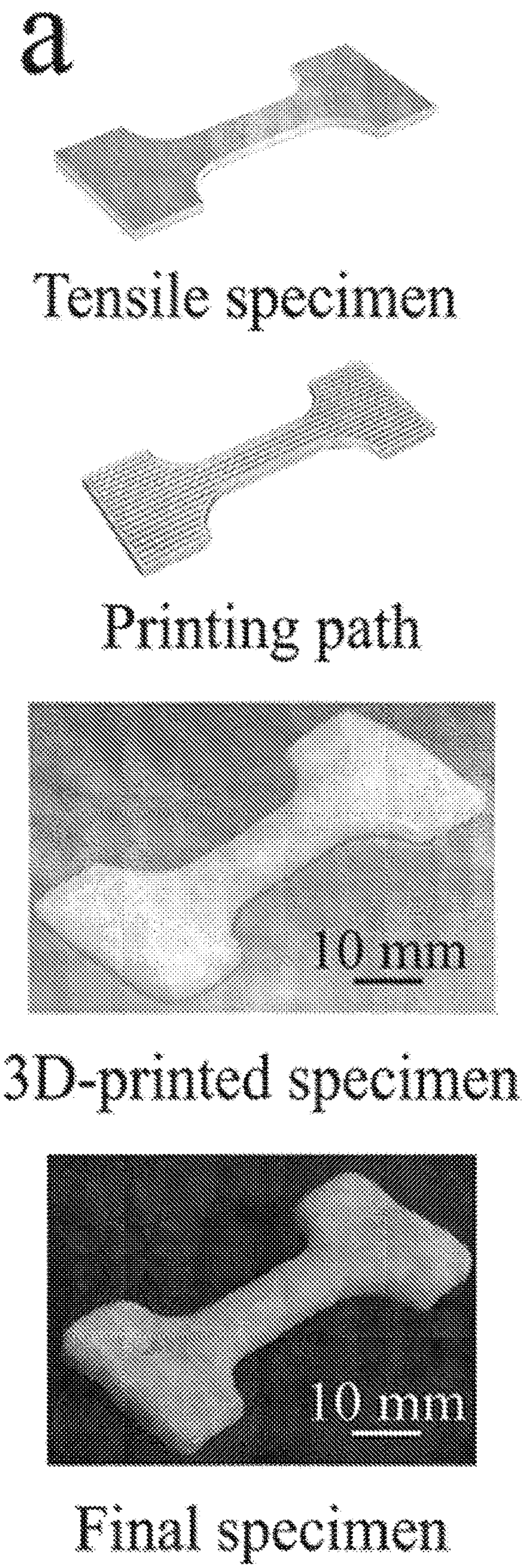
FIG. 3. Investigation of the influence of the process parameters $T_{max}$, CR and $C_{GG}$ on the tunable mechanical properties. (a) 3D-printed microtensile test specimens used in tensile tests. (b & c) Parameter effects and their relative contributions to Young's modulus. (d & e) Relative contributions of parameter effects to yield strength.
Figure 3:
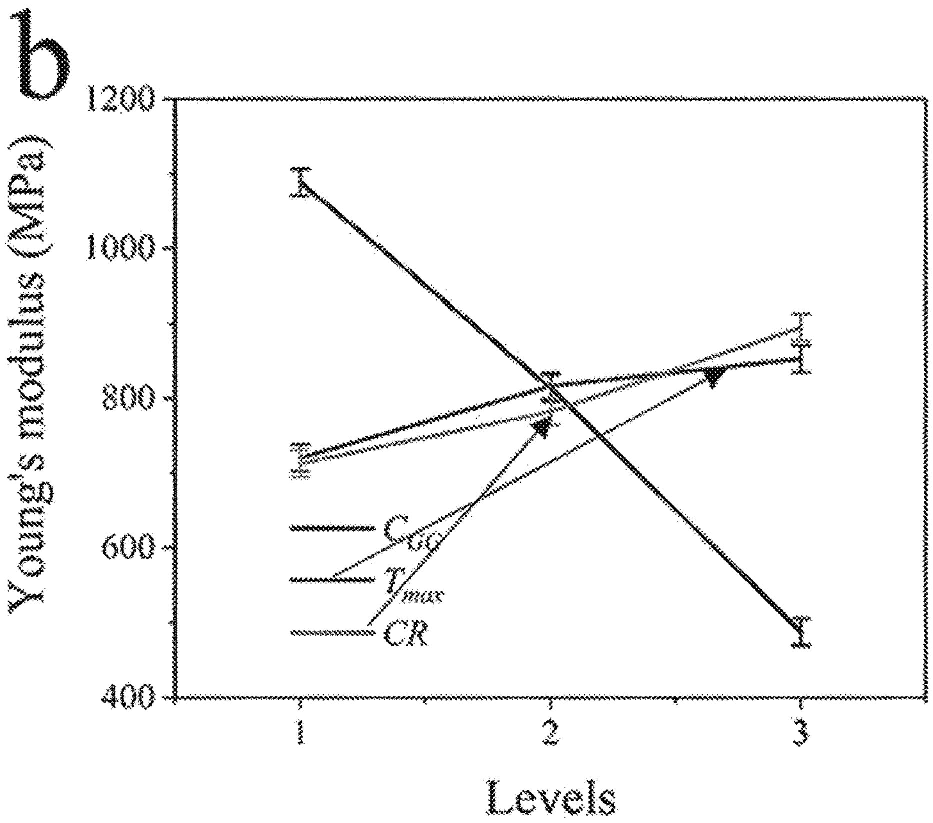
Figure 3:
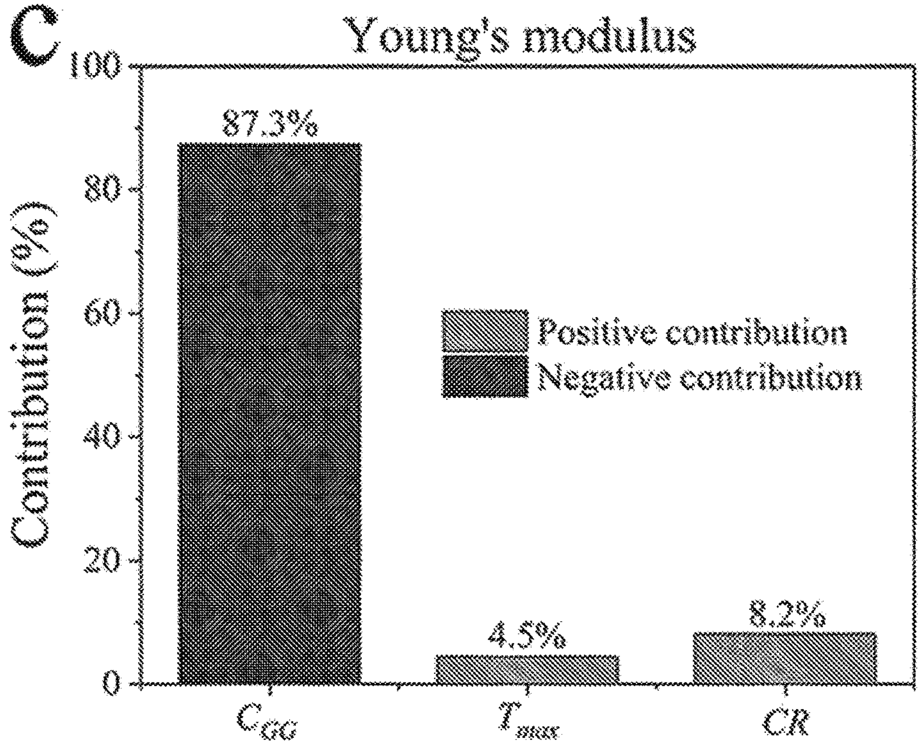
Figure 3:
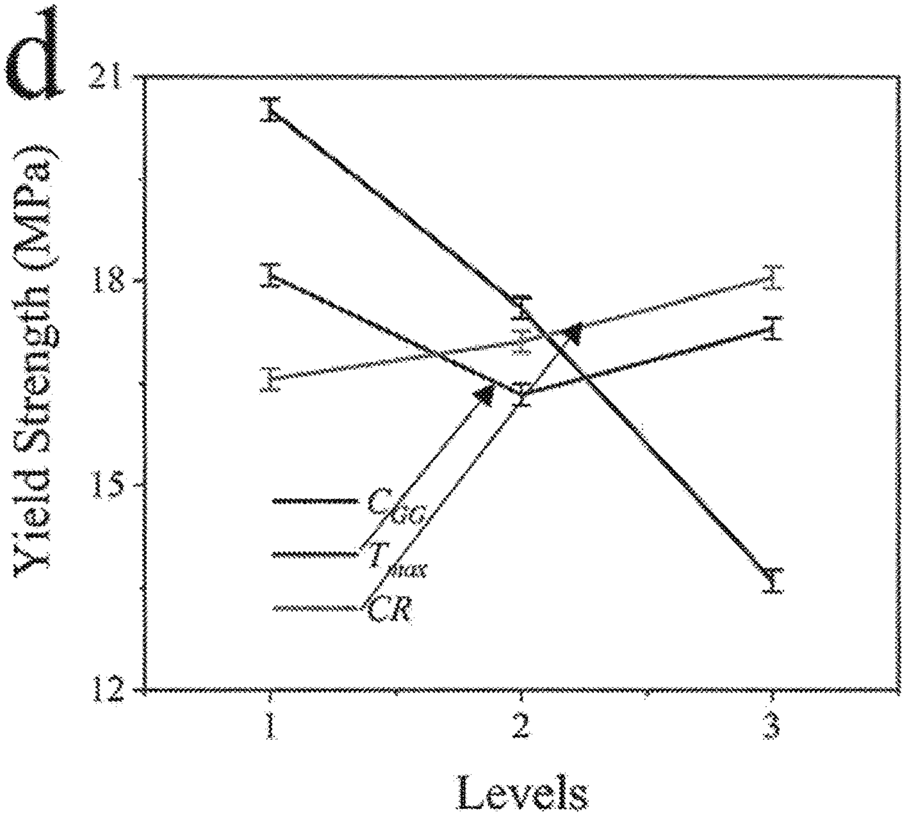
Figure 3:
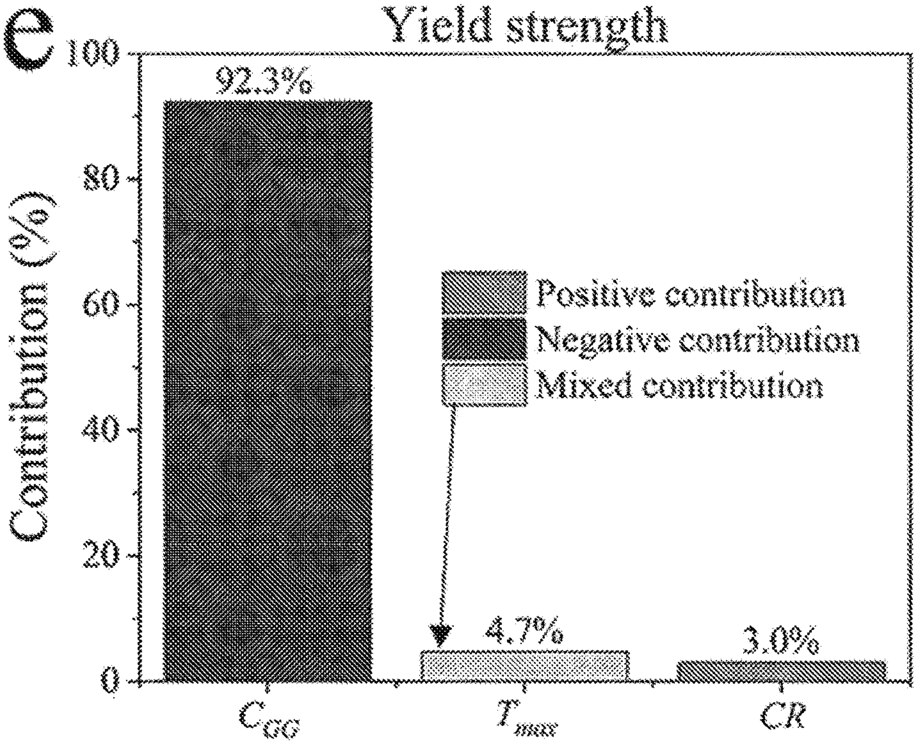
Figure 9:
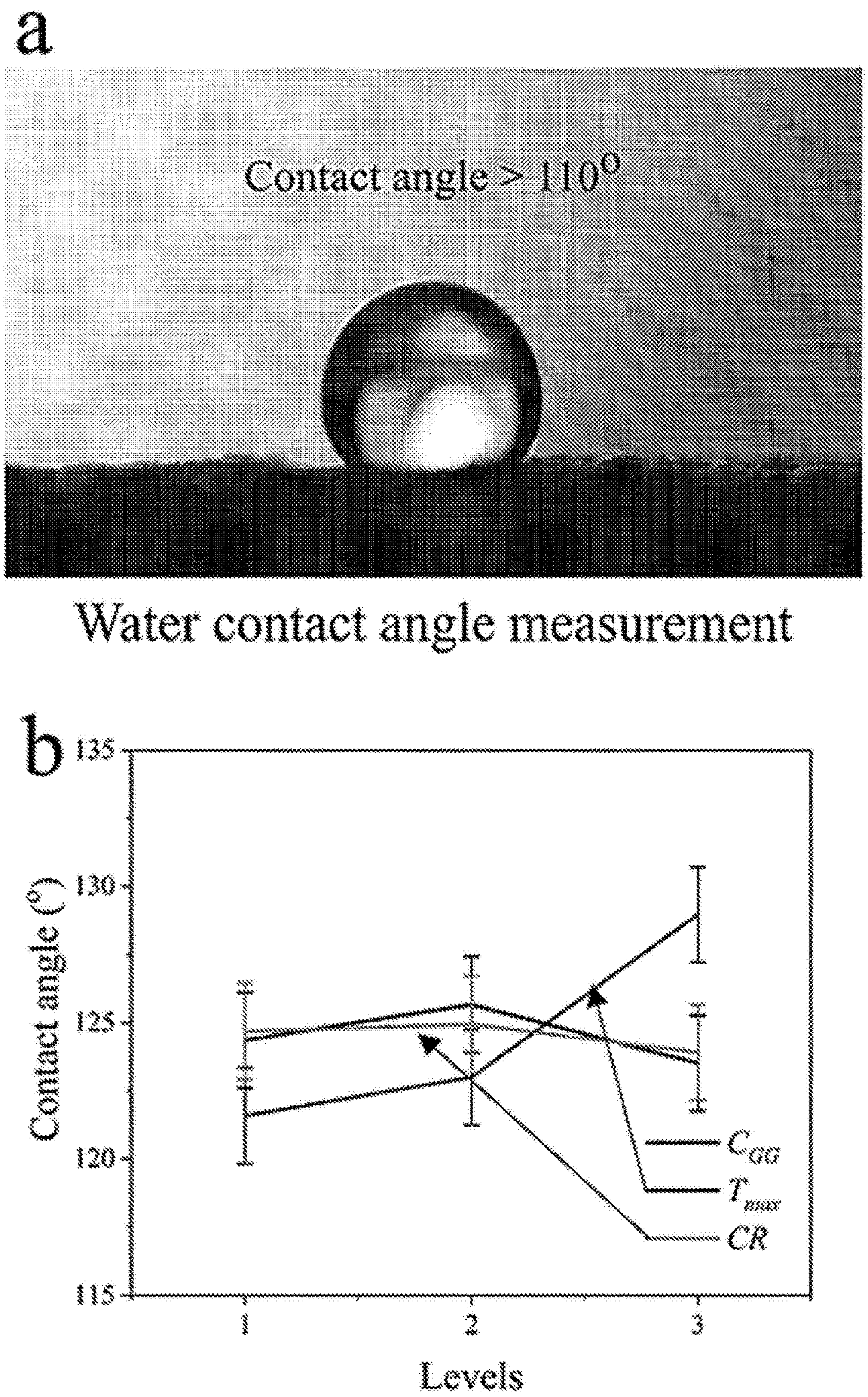
FIG. 9. Effects and contributions of the factors on the water contact angles measured. (a) Water contact angle of >110°. (b) Effects of $C_{GG}$, $T_{max}$, and CR on the contact angle. (c) Percent contributions of the parameters to the contact angle.
Figure 9:
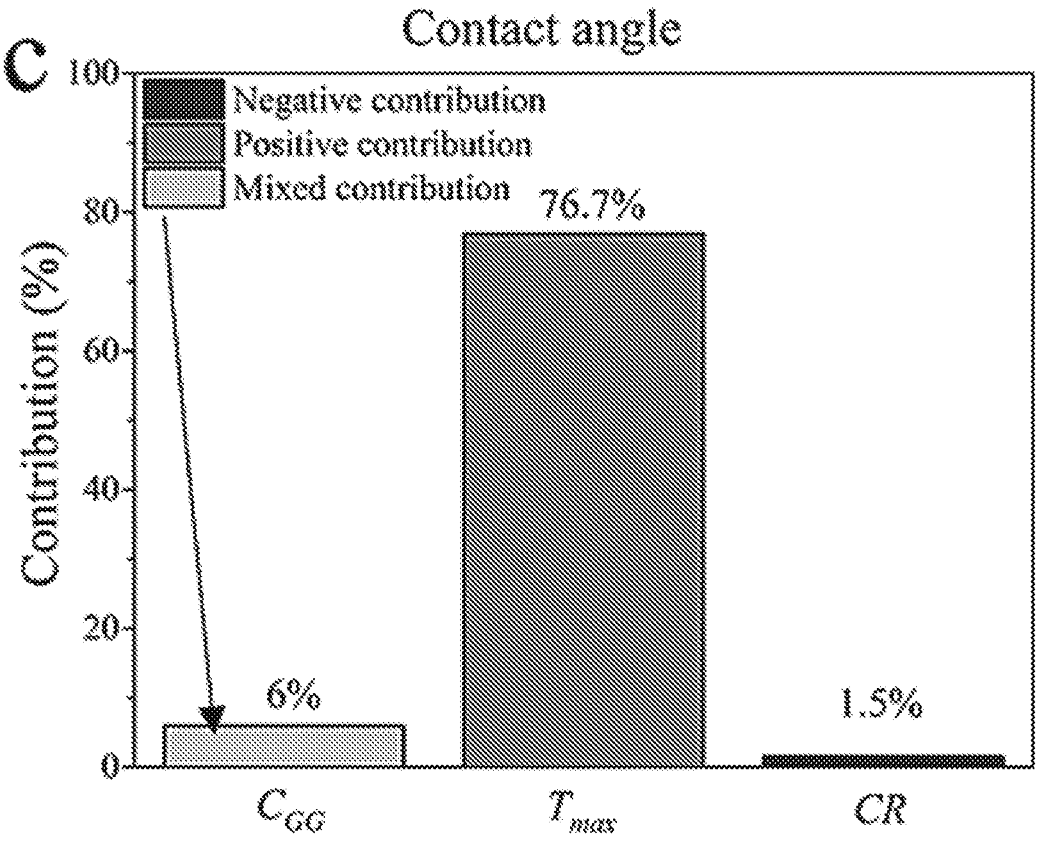

We created a computer-aided model of a micro-tensile test specimen for quasistatic uniaxial tensile tests. The specimens were printed and exposed to specific thermal treatment profiles based on the L9 Taguchi array (FIG. 3*a*, See Note S1). Each specimen was tested under quasistatic tensile loading with a universal tensile test machine while recording force-displacement curves. We then determined the Young's modulus and yield strength for each specimen from experimental stress-strain curves. We carried out the Taguchi method with a 95% confidence interval to determine the main effects and the contributions of the parameters chosen on the mechanical properties. We also carried out the same procedure for the water contact angle. We observed that all the specimens tested exhibited hydrophobic surfaces with contact angles larger than 110° (FIG. 9*a*). The DOE results indicated the parameters studied did not have any significant influence on the contact angle (FIG. 9). FIGS. 3*b* and 3*c* show the effects of the parameters studied and their relative contributions on Young's modulus, respectively. We observed that the Young's modulus of the 3D-printed specimens decreased as $C_{GG}$ increased (from level 1 to 3), and that this resulted in a negative effect. On the other hand, increasing CR and $T_{max}$ had a positive effect on the Young's modulus. $C_{GG}$ was found to have the highest effect (87.3%) on the Young's modulus followed by CR and $T_{max}$ (FIG. 3*c*). We found that $C_{GG}$ also had the largest impact (92.3%) on the yield strength, such that increased concentrations reduced the yield strength of the 3D-printed specimens (FIGS. 3*d* and 3*e*). Moreover, we observed that the increased CR resulted in higher yield strength while $T_{max}$ had a mixed contribution, an initial decrease followed by an increased in yield strength. These results show potential routes for tuning mechanical properties of 3D printed PTFE parts depending on applications.

Figure 10:
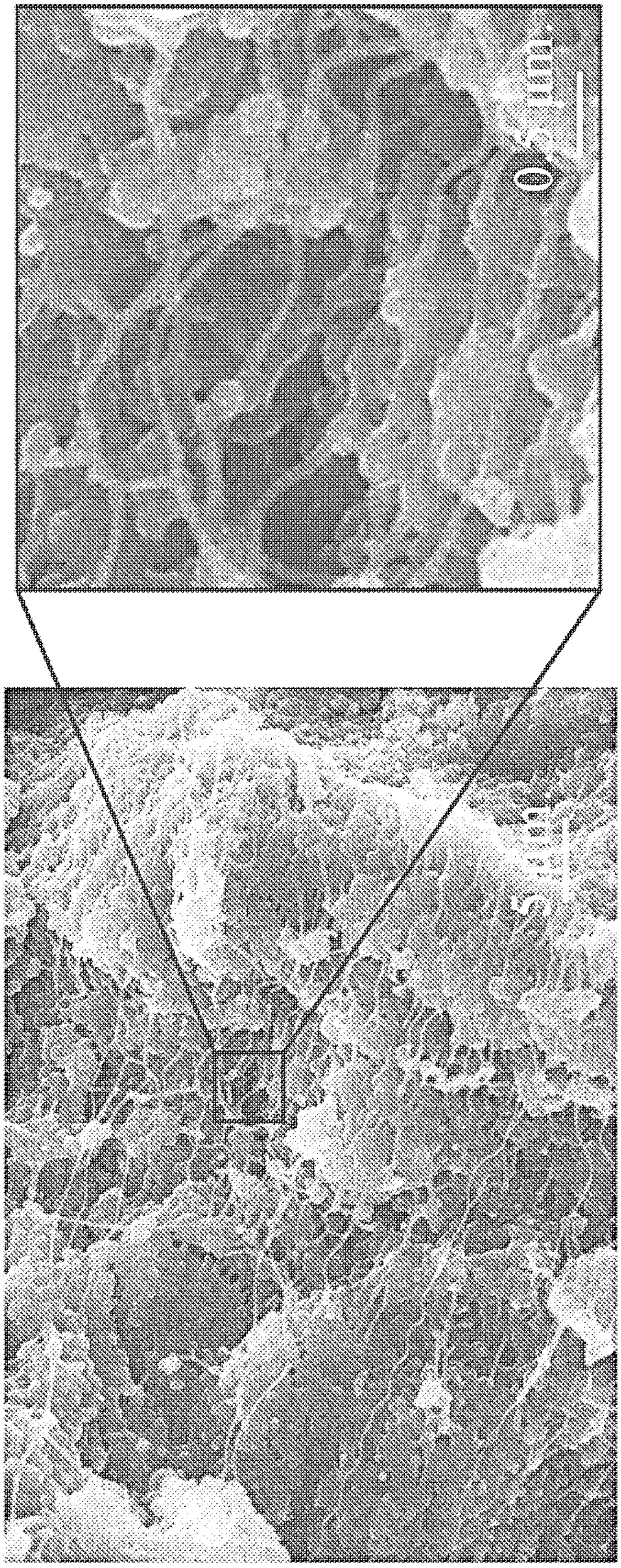
FIG. 10. Scanning electron microscope images. (a) The dried PTFE ink showing the GG networks embedded within the PTFE particles. (b) PTFE emulsion without any GG before thermal treatment (left), and thermally treated PTFE emulsion at 420° C. maximum exhibiting fibrillated microstructure. (c) shows the percent contribution of $C_{GG}$, $T_{max}$, and CR to contact angle.
Figure 10:
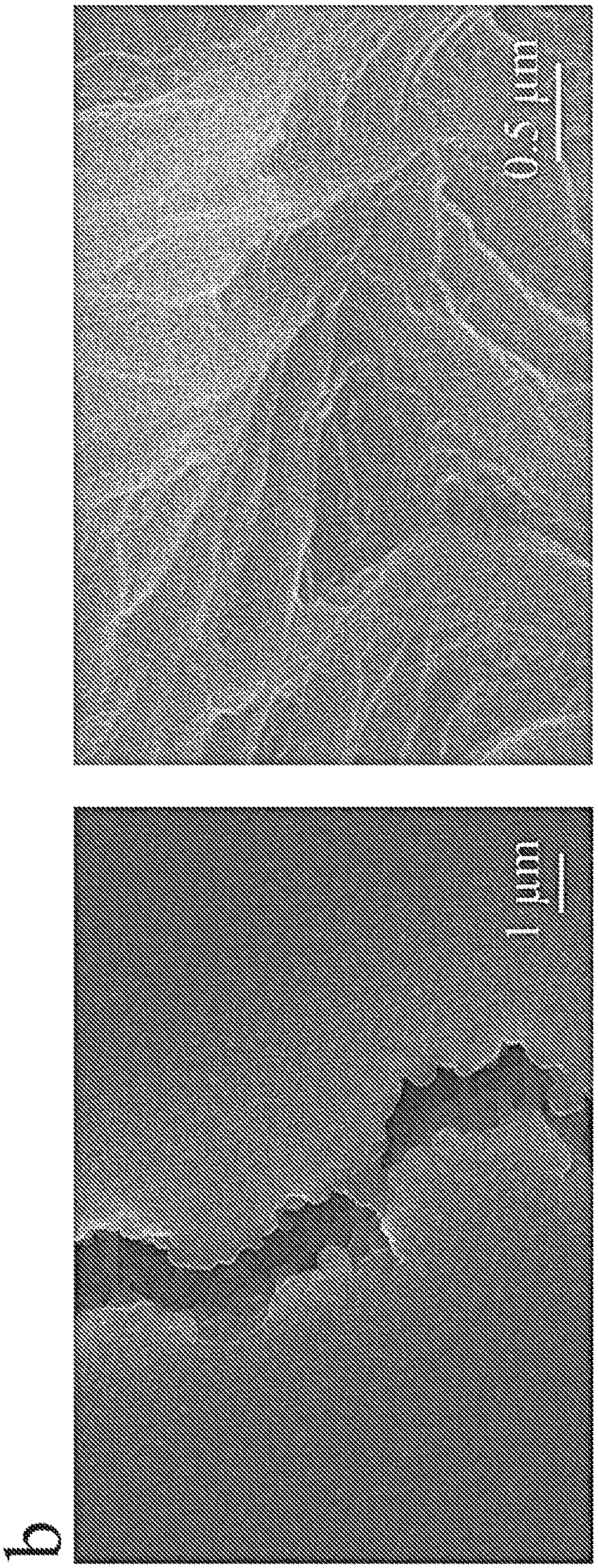

We attribute the changes in the mechanical properties to the microstructure created during the thermal treatment. To confirm this rationale, we further investigated the large changes in the mechanical properties observed during the DOE study, taking into account the lowest and highest Young's modulus cases determined from the DOE study (See Note S2 and Table S3 for the parameter levels used). We 3D-printed, applied thermal treatment and freeze-fractured specimens for the two cases considered and imaged them using scanning electron microscopy (SEM, FIG. 4*a*). We observed unique microstructures in both high and low Young's modulus specimens. The high modulus samples exhibited a uniformly distributed fibrillar microstructure. We attribute these distinct features to the fusion and coalescence of the PTFE particles during thermal treatment, which was also confirmed by the SEM characterization of the thermally treated PTFE dispersion without any GG present (FIG. 10). In contrast, the low Young's modulus samples were heterogeneous with two distinct microstructures, one with fibrillar features similar to the high modulus samples but another highly porous region where the PTFE particles had not completely coalesced. We attribute the difference in the microstructure and low modulus values to the lower $T_{max}$ (340° C.) and higher $C_{GG}$ (1.5%) used in the low Young's modulus samples resulting in high porosity compared to the high modulus samples.

Figure 4:
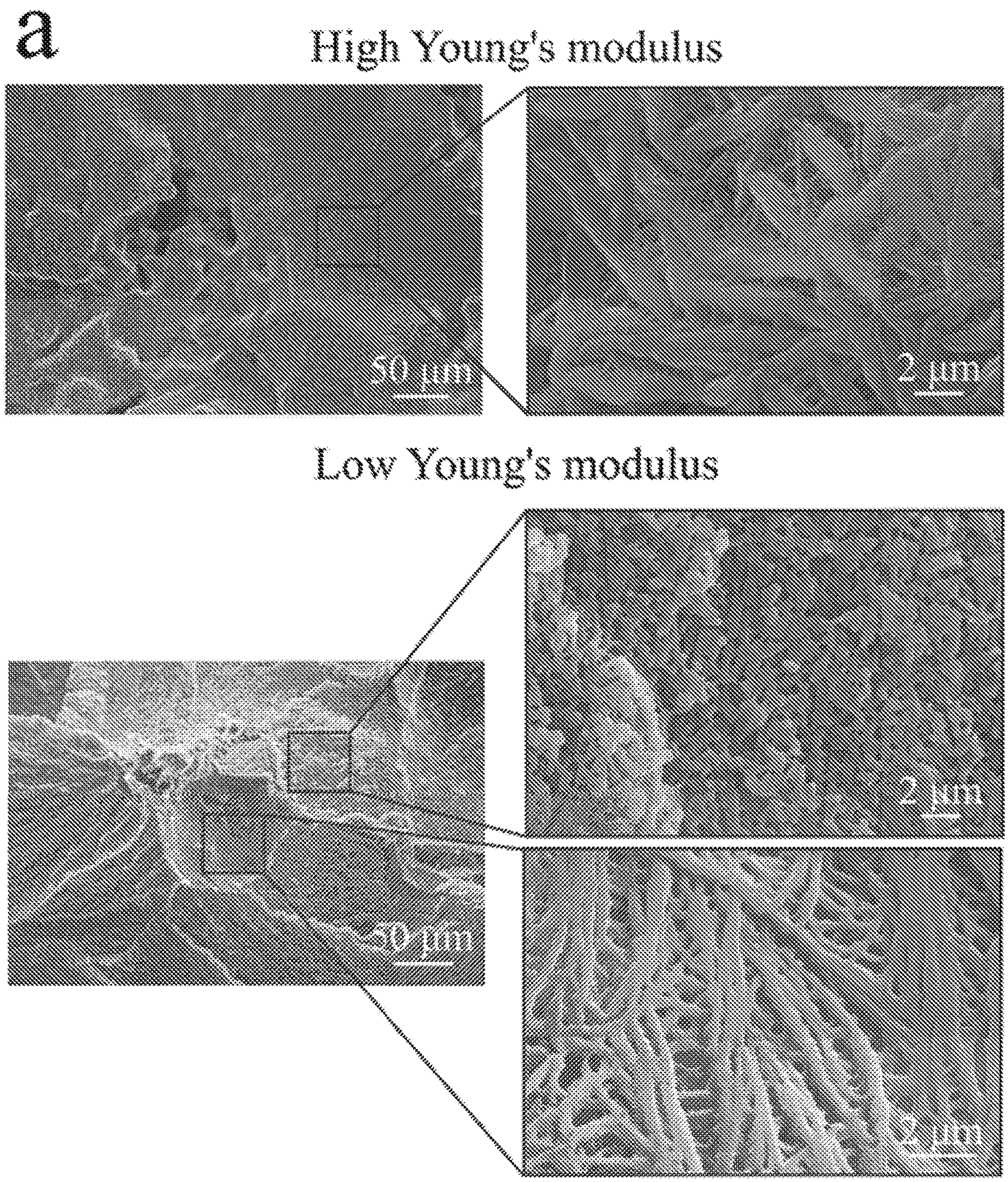
FIG. 4. Characterization of the microstructure, modulus and chemical inertness of the 3D printed structures. (a) Progressively zoomed-in SEM images indicating the microstructure of the low and high modulus samples determined from the DOE study. (b) Average stress-strain relationships measured using the 3D-printed PTFE and reference PTFE specimens. (c) Bar graph showing the mass percent loss for 3D printed PTFE parts after immersion in hydrochloric acid for a week.
Figure 4:
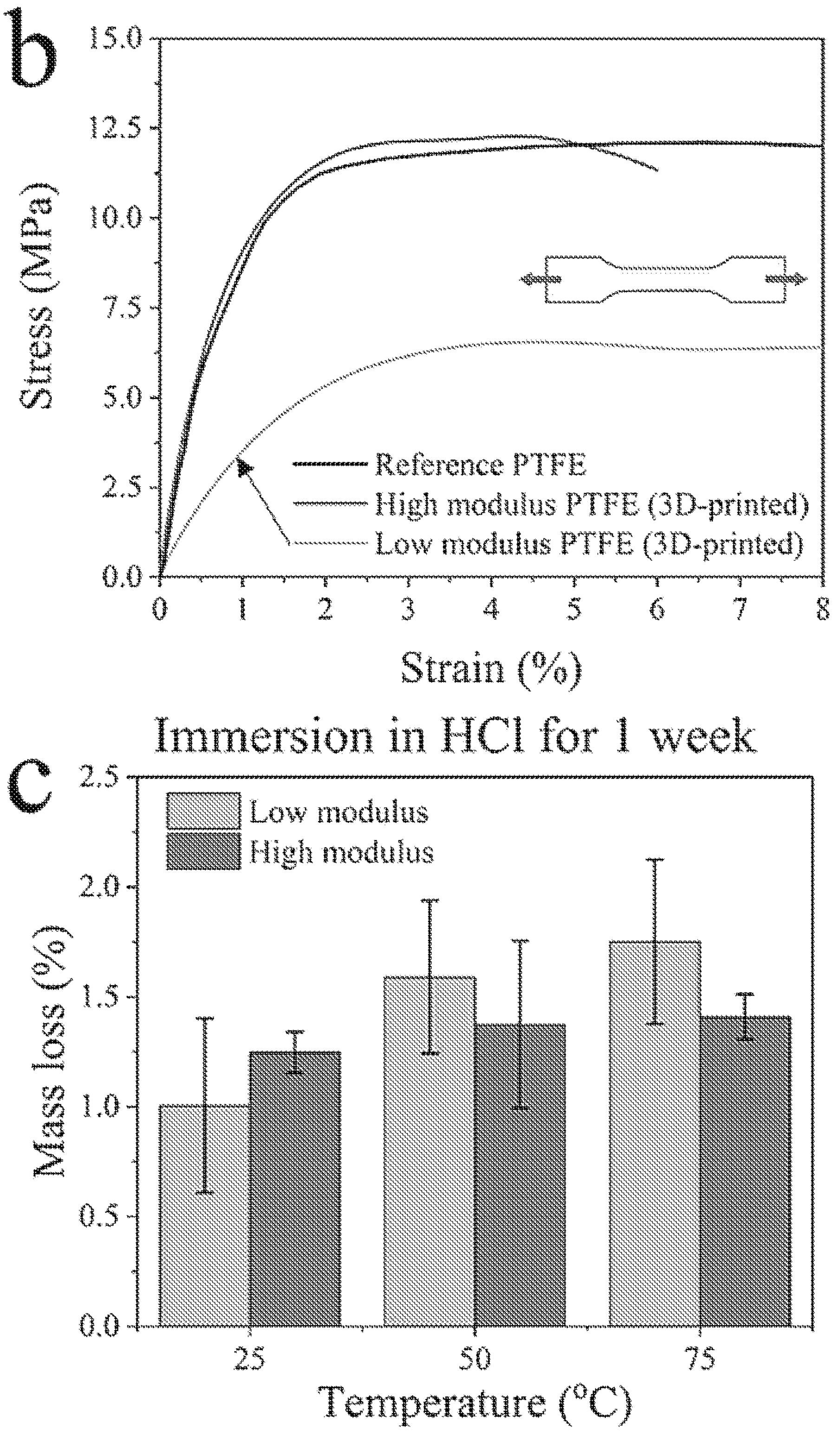
Figure 11:
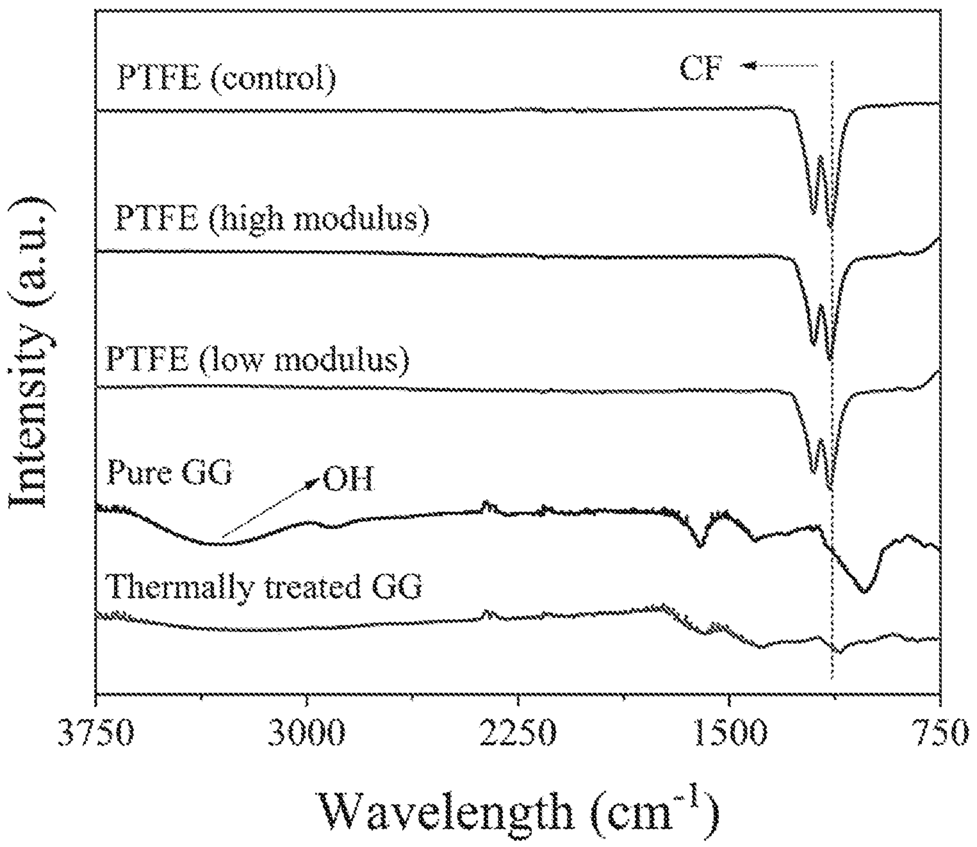
FIG. 11. Fourier-transform infrared spectroscopy (FTIR) spectra for the control PTFE, 3D-printed and thermally treated PTFE, pure GG and thermally treated GG.
Figure 12:
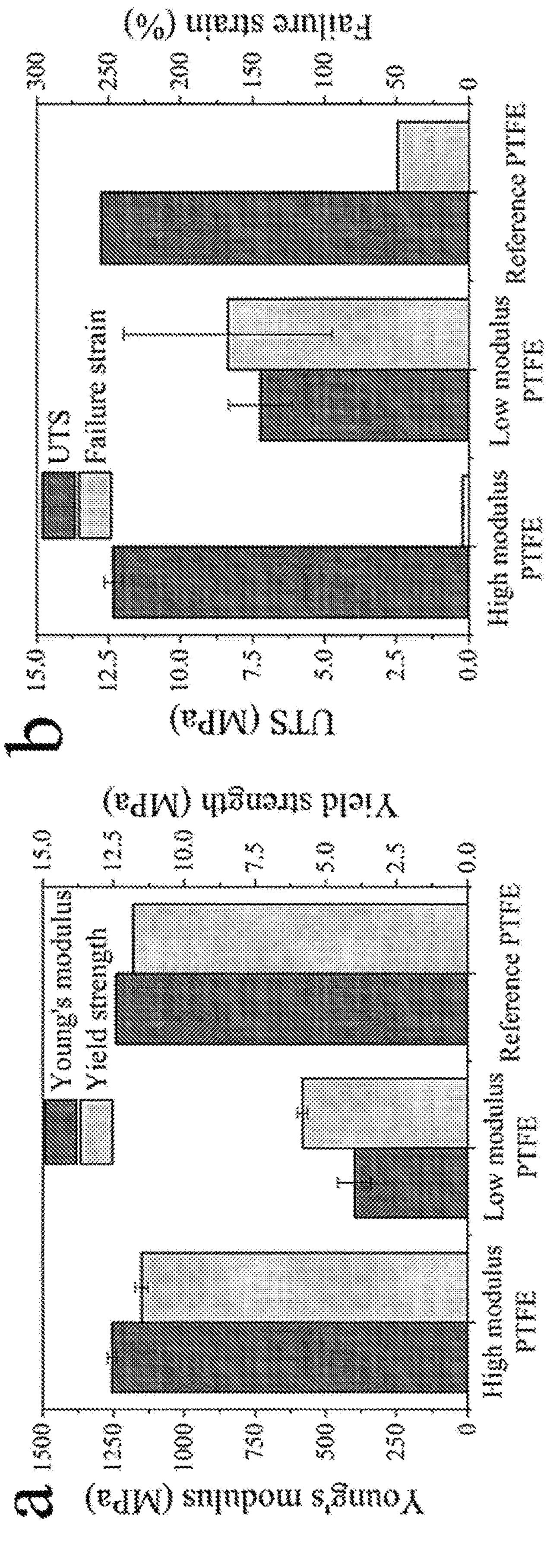
FIG. 12. Mechanical properties of the 3D-printed and reference PTFE specimens. (a) Bar graph showing the Young's modulus and yield strength of the PTFE specimens. (b) Bar graph showing the ultimate tensile strengths and failure strains of the 3D-printed and reference PTFE specimens.

We further confirmed that GG was removed from the thermally treated samples for both low and high modulus printed structures, by using Fourier transform infrared (FTIR) spectroscopy (FIG. 11). Both low and high modulus printed structures that were thermally treated had spectra similar to the control PTFE samples, and no OH peaks (~3200 $cm^{-1}$) from GG were observed. This result indicates that the chemical composition of the printed PTFE constructs was similar to that of the PTFE particles. Additionally, we compared the mechanical response of both high and low moduli 3D-printed PTFE micro-tensile specimens to published data on molded PTFE (FIG. 4*b*). High modulus specimens exhibited similar moduli to those of molded PTFE. On the other hand, low modulus specimens showed a more compliant response compared to the molded and high modulus PTFE specimens. We attribute the lower modulus in the low Young's modulus specimens to their unique porous microstructure. In addition, we observed that the ultimate tensile strength (UTS) of the high modulus specimens were comparable to reference PTFE while low modulus specimens showed lower UTS values (FIG. 12). We also observed that the failure strains were higher for low modulus specimens compared to PTFE, which may be desirable in high strain applications. Finally, we verified the chemical inertness of the 3D-printed PTFE structures by submerging them in hydrochloric acid at different temperatures for a week. We observed that the 3D-printed PTFE structures showed an insignificant mass loss (less than a couple of percent) under these extreme conditions as shown in FIG. 4*c*.

Figure 5:
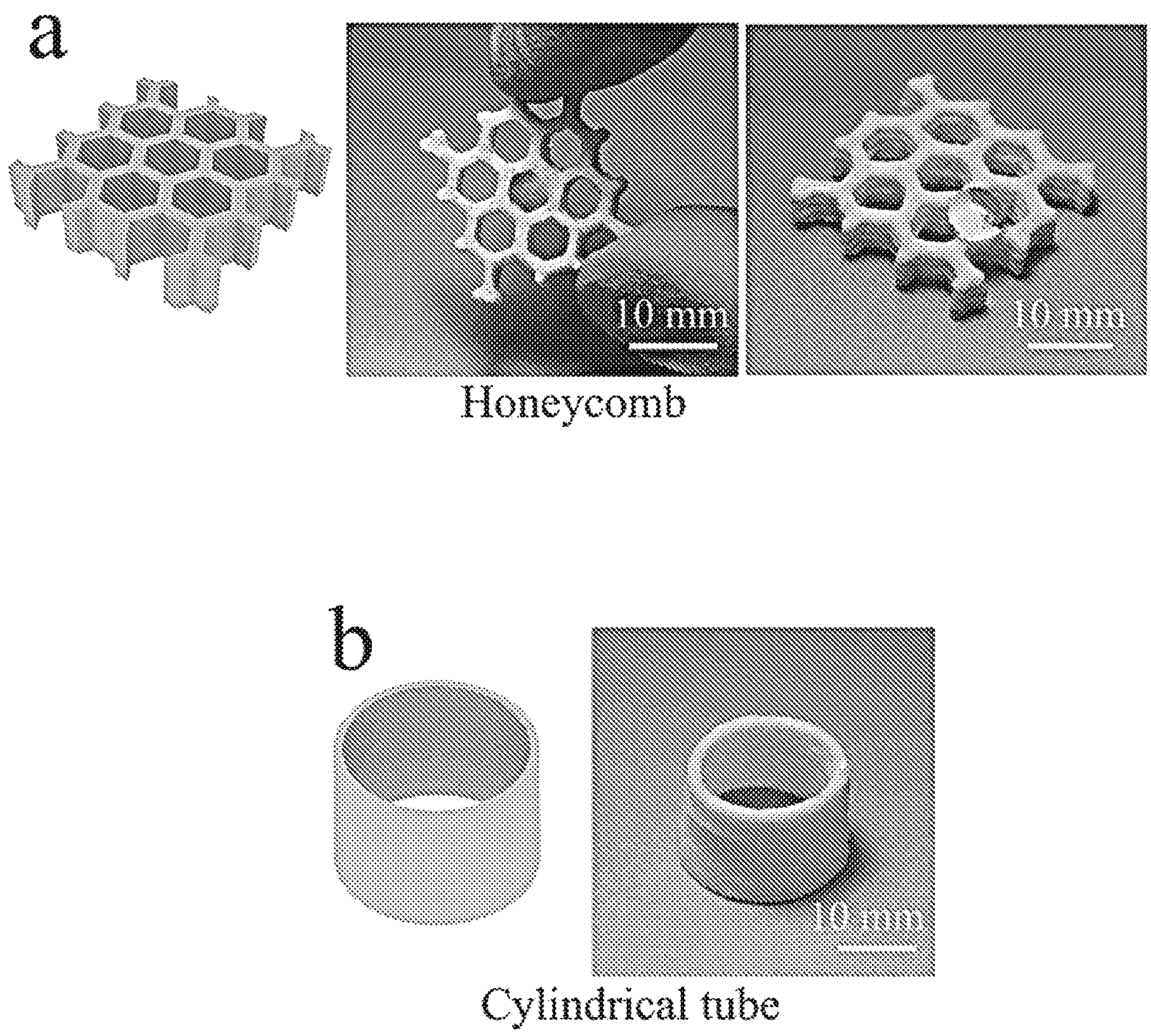
FIG. 5. Examples of 3D renderings and printed structures. (a) Rendering and photograph of a 3D-printed honeycomb PTFE structure (left) and with a droplet of water (right) pinned on its surface illustrating its hydrophobic nature. 3D Rendering and photograph of 3D-printed (b) high-aspect ratio tube (c) tubular propeller, and a (d) bicuspid aortic valve, respectively. All scale bars are 10 mm.
Figure 5:
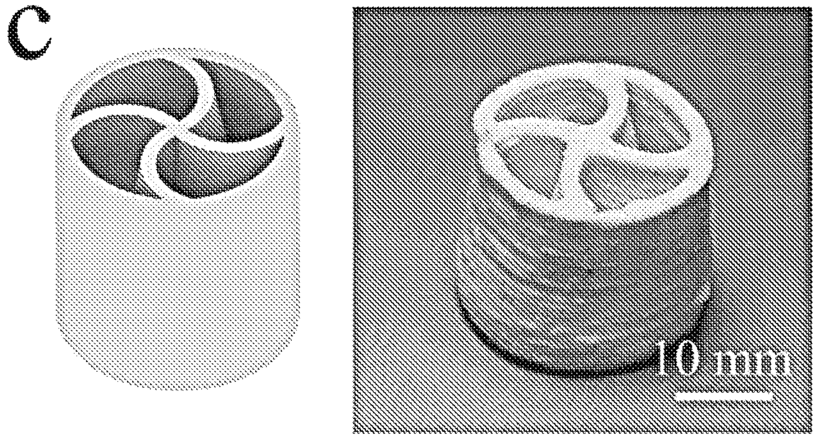
Figure 5:
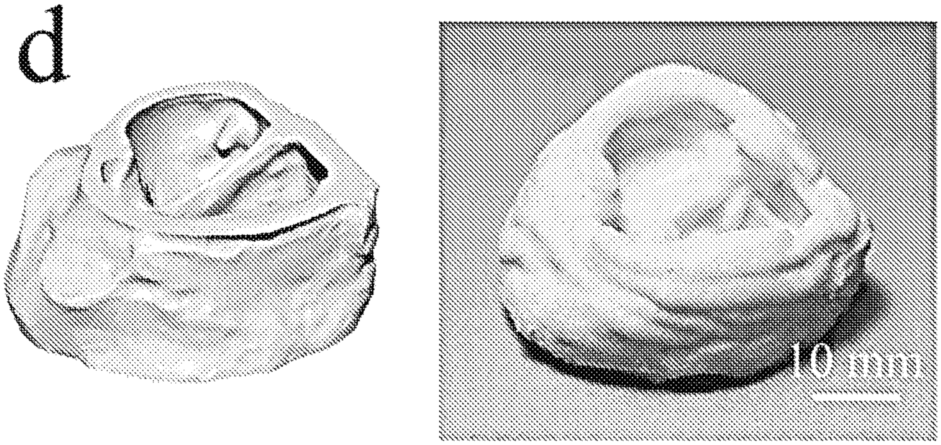

An aspect of the presently described additive manufacturing process is the ability to create customizable complex PTFE parts. Customization is important for personalized medicine and avoiding the "one size fits many" paradigms. We designed a variety of 2D and 3D structures. The material composition and processing conditions for the high modulus case, as determined from the DOE study, were employed to 3D-print these structures. FIG. 5*a* is a 3D printed PTFE honeycomb as a demonstration for structural application and illustrates the hydrophobic nature of the material as evidenced by the water droplet with a high contact angle on its surface. FIG. 5*b* is a cylindrical tube as a demonstration for fluid applications, and it illustrates the capability of printing a high aspect-ratio geometry. More complex and biomimetic structures included a propeller prototype containing twisting inner blades, and a bicuspid aortic valve (FIGS. 5*c* and *d*); it would be difficult to make such convoluted shapes using conventional PTFE molding approaches. Additionally, the shape and size of such structures can be customized and tuned, in addition to other advantages of DIW processing such as low cost, easy accessibility and low waste.

Thus, the present disclosure provides a new and versatile fabrication process for, among other uses, 3D-printing PTFE parts using DIW. The fabrication method is enabled through the development of a new shear-thinning ink combining PTFE particles and GG. Further, an appropriate thermal treatment process was identified such that additives in the ink could be removed and mechanical and chemical properties similar to pure PTFE could be obtained. We also analyzed effects of the processing on the mechanical response of the 3D-printed PTFE and demonstrated possible routes to tune the material properties, which allow customizing both geometry and mechanical properties depending on applications. The additive fabrication method enables a larger design space for PTFE while utilizing its unique properties such as hydrophobicity, chemical resistivity, and biocompatibility. It is considered that the presently provided PTFE additive manufacturing process will open up a range of opportunities for PTFE parts in terms of design customization, low cost, low waste, scalability and complexity that may not be possible with conventional methods.

Experimental Section

Materials: Gellan Gum (G1910 Gelzan Cm) in powder form was obtained from Sigma-Aldrich. Polytetrafluoroethylene (PTFE) dispersion (60% weight concentration) was obtained from Sigma Aldrich. All materials were used as received without any modifications.

Ink preparation: PTFE dispersion and GG formulations were made based on the desired weight concentrations. The PTFE dispersion was heated up to 50° C. and GG was added to the dispersion while mixing it with a magnetic stirrer (HI 190M, Hanna Instruments). The ink was then loaded into a planetary mixer (Mazerustar KK-250S, Kurabo Industry Ltd.) and was mixed at 3000 RPM for 90 seconds 2 times. Then, the ink was transferred to the cartridges and centrifuged at 1000 RPM for 60 seconds.

Ink Rheology: Rotational rheology measurements were performed on a Anton-Paar Instruments MCR-9 rheometer, using a plate-to-plate setup with a 1 mm gap. The temperature of the plate was kept at 23° C. Ink viscosities were measured at shear rates ranging from 0.01 to 1000 $s^{-1}$. Oscillatory measurements of the elastic and viscous moduli were performed at a constant frequency of 1 Hz.

3D-printing structures: Cartridges with inks were loaded to an air-driven 3D Printer (Inkredible$^{+}$ 3D Bioprinter, Cellink). The structures were printed with an 18 G (0.8 mm) nozzle at pressure levels varying from 10 to 170 kPa. The structures were printed on a Teflon™ sheet to aid the removal of the printed structures from the substrate.

Thermogravimetric analysis (TGA): The thermal degradation characteristics of the inks were investigated with a thermogravimetric analyzer (TGA 8000™, PerkinElmer). The samples were tested in a nitrogen environment.

Thermal treatment: The 3D-printed structures were removed from the Teflon substrate and placed onto a steel mesh to avoid any thermal stresses during treatment. Then, the structures were placed into a 1100° C. high-temperature box furnace (Model BF51700 Series, Lindberg/Blue) to facilitate the multistage thermal treatment shown in FIG. 8.

Tensile testing: Computer-aided-design models for the microtensile test specimens were generated based on the ASTM D1708 (Standard test method for tensile properties of plastics by use of microtensile specimens). 3D-printed specimens were tested under quasistatic uniaxial loading with an tensile test machine (Instron E1000) with a 12 mm/min displacement rate. Force-displacement curves were recorded at 100 Hz with a 250 N load cell for all specimens.

Scanning Electron Microscope (SEM): The SEM images were taken with the JEOL JSM IT100 Scanning Electron Microscope, operated at 20 kV. The samples were sputter coated with a thin gold layer before imagining to avoid charging.

Fourier-transform infrared spectroscopy (FTIR): Infrared spectra of the thermally treated PTFE samples were obtained using a FTIR spectrometer (Nicolet Nexus 670 FTIR).

Statistical analysis: All the statistical and Taguchi design-of-experiments analysis were carried out in JMP statistical analysis software (SAS Inc.). 95% confidence interval ($p<0.05$) was employed in all of the calculations.

Note S1. 3D-Printing: 3D Computer-aided-design (CAD) files of all the printed structures were generated in Solidworks (Dassault Systemes) and saved in a "Standard Tessellation Language (STL)" format. Then, the printing paths (G-code) were generated using Sli3r software embedded in Repetier Host. We selected the layer height, printing speed, and infill ratios based on the ink formulation and the design printed. All structures were printed with an air-pressure driven printer using a single syringe (Inkredible+, Cellink). We 3D-printed structures on different substrates including glass Petri dishes, silicon wafers, and rectangular glass slides covered with Teflon™ sheets. We found that it was challenging to lift off the 3D printed structures from Petri dishes and silicon wafers due to strong adhesion. Hence, we used glass slides covered with Teflon™ sheets as our substrates since the hydrophobic nature of the Teflon™ sheets allowed us to detach the structures from the substrate after printing. We investigated the printability of ink formulations on the Teflon™ substrates by printing 30 mm long test lines with a 0.8 mm nozzle (FIG. 6). We observed that the inks with gellan gum (GG) concentrations between 0.5% and 1.5% were printable while other concentrations either resulted in liquid-spreading or clogging of the nozzles.

Figure 7:
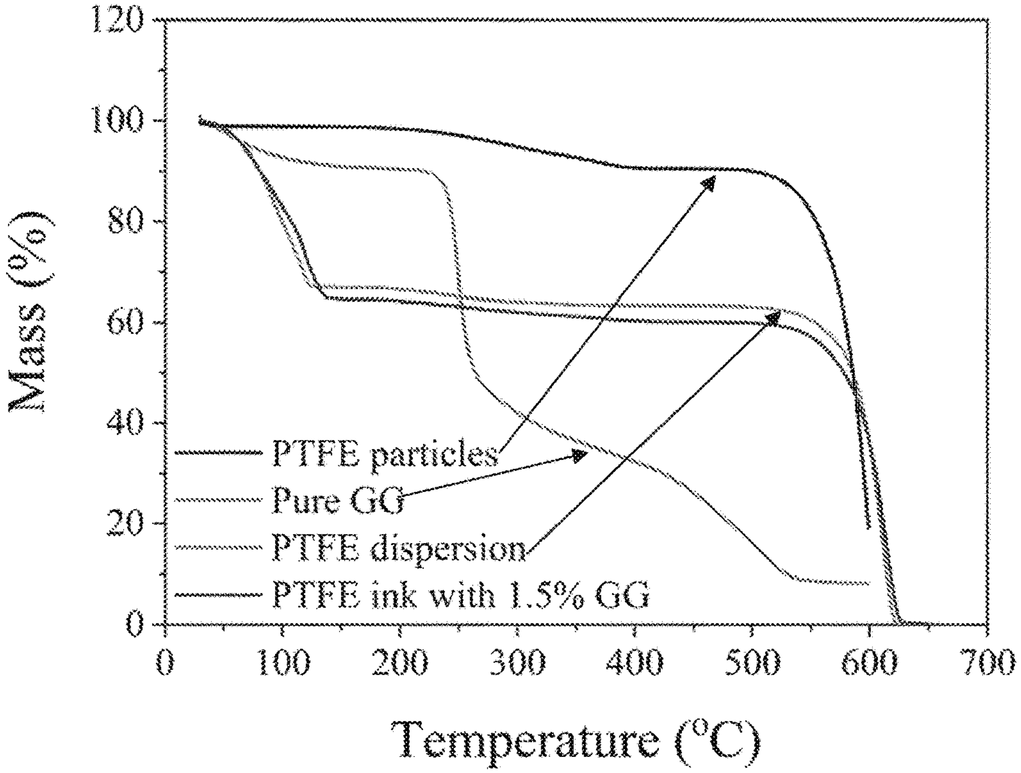
FIG. 7. Thermal degradation profiles of PTFE particles, pure GG powder, PTFE dispersion and PTFE ink with 1.5% GG concentration.

Note S2. Details of the thermal treatment of 3D printed structures: We investigated the thermal degradation of the PTFE particles, pure GG, PTFE dispersion and the PTFE ink with 1.5% GG concentration using thermogravimetric analysis (TGA). The materials were loaded on a ceramic plate and heated up to −700° C. with a 10° C./min heating rate while measuring the mass change (FIG. 7).

Figure 8:
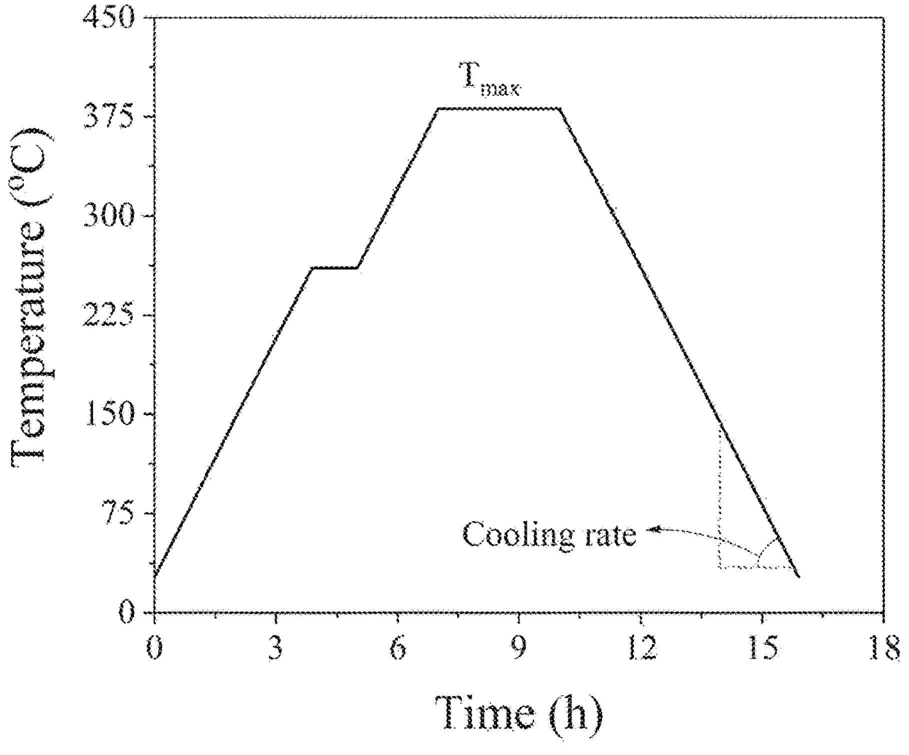
FIG. 8. Graph of the multistage thermal treatment used to coalesce and fuse the micron-sized PTFE particles within inks to obtain the final 3D printed structures.

We employed a multistage thermal treatment to remove the non-PTFE additives (water, surfactants, and GG) from the printed structures to obtain PTFE-only parts. For this purpose, we removed the 3D-printed structures from the glass slides covered with Teflon™ sheets and placed them on a stainless-steel mesh, solid steel plates, or silicon wafers for heat treatment. We observed that 3D-printed structures showed cracks during the treatment due to differences in the thermal expansion coefficients between the printed structures and the substrates when solid steel plates or silicon wafers were used. Hence, we employed stainless steel meshes to ensure uniform heating while limiting the contact between the structures and the substrate. We used a high-temperature furnace capable of reaching 1100° C. (Model BF51700 Series, Lindberg Blue). The desired temperature profiles, heating and cooling rates and duration of the treatment were programmed using the built-in temperature control panel. FIG. 8 shows a representative temperature profile used during thermal treatment.

Note S3. Optimization of the process using a statistical Design of Experiments: Design of experiments (DOE) is a set of widely used statistical techniques to investigate the effects of process parameters on predetermined process outcomes. These methods allow the study of problems which involve a large number of parameters in a cost-effective and efficient way. Some of the conventional DOE methods include full-factorial and response surface designs. However, the number of experiments required to determine the effects of the parameters in a process becomes large with these conventional DOE methods making them unsuitable for studies involving a large number of parameters.

In this work, we adopted a DOE technique called the Taguchi method to quantify the effects of the processing parameters used during the thermal treatment on the mechanical properties of the 3D-printed PTFE structures. Taguchi DOE method has been widely used in product development and optimization of processes involving a large number of parameters. It utilizes special arrays called Orthogonal Arrays (OAs) to reduce the possible number of experiments involved in other DOE methods such as full factorial techniques while determining the possible parameter effects on the processes. The rows of the array correspond to a specific experiment while the columns indicate the parameter levels required for a given row. Experiments are generally carried out with replicates that are tuned to the specific parameters within the array that are selected.

We hypothesized that the thermal treatment and the material composition might have significant effects on both mechanical and surface properties. Hence, we selected the maximum temperature reached during thermal treatment ($T_{max}$), cooling rate (CR) and Gellan Gum concentration ($C_{GG}$) as three parameters for the Taguchi DOE method. We studied the effects of the parameters at three different levels. $T_{max}$ was selected as one of the parameters where the PTFE particles melt and coalesced at around this temperature to form the final structure. For the DOE study, we investigated the temperature range from 340° C. to 420° C. where PTFE exhibits the lowest shrinkage while forming solid parts. We selected CR as our second process parameters since it has been shown that cooling rate has a significant influence on the degree of the PTFE crystallinity when it is below 600° C./hr. Hence, we studied the effect of CR by choosing values between 12° C./hr and 150° C./hr. In addition to the thermal processing parameters, we also considered the effect of the $C_{GG}$ on the mechanical properties since Gellan Gum was used as a shear thinning and binding agent for the PTFE inks. We selected the levels for the $C_{GG}$ from the printable ink compositions between 0.5% and 1.5%. Table S1 shows three levels used for each parameter considered for the DOE study.

TABLE S1

Parameter levels used in Taguchi design-of-experiments (DOE) to determine the effects of processing and material parameters on the mechanical properties. We investigated three parameters ($T_{max}$, CR, and $C_{GG}$) at three different levels.

| Parameter | Level-1 | Level-2 | Level-3 |
|---|---|---|---|
| $T_{max}$ (°C) | 340 | 380 | 420 |
| CR (°C/hr) | 12 | 60 | 150 |
| $C_{GG}$ (%) | 0.5 | 1.0 | 1.5 |

We employed an L9 orthogonal array based on the number of parameters and levels chosen for Taguchi DOE method. Table S2 shows the L9 array with the assigned parameter levels. We conducted uniaxial tensile tests to determine the mechanical properties (Young's modulus and yield strength) and measured contact angles in three replicates. After the experimental data collection, we carried out the statistical analysis (ANOVA) using the JMP statistical analysis software (SAS Institute Inc., Cary, NC) with a confidence interval of 95%. The parameter effects and their relative contributions to the outcomes selected were determined based ANOVA results. FIG. 9 shows the DOE results for the water contact angles measured. All the tested specimens exhibited hydrophobic surfaces. We also observed that the parameters included in the DOE did not have significant influence on the contact angle.

TABLE S2

The L9 orthogonal array used for the Taguchi method.

| | Parameters | | |
|---|---|---|---|
| Experiment | $T_{max}$ (°C) | CR (°C/hr) | $C_{GG}$ (%) |
| 1 | 340 | 12 | 0.5 |
| 2 | 340 | 60 | 1.0 |
| 3 | 340 | 150 | 1.5 |
| 4 | 380 | 12 | 1.5 |
| 5 | 380 | 60 | 0.5 |
| 6 | 380 | 150 | 1.0 |
| 7 | 420 | 12 | 1.0 |
| 8 | 420 | 60 | 1.5 |
| 9 | 420 | 150 | 0.5 |

In addition to ANOVA, "the larger the better" and "the smaller the better" objective functions were applied in the data analysis to determine the maximum and minimum values of Young's modulus within the selected design space. Table S3 shows the parameter levels determined from the Taguchi method to obtain maximum and minimum Young's modulus.

TABLE S3

Ink concentration and thermal processing parameters for the low and high moduli PTFE were determined from Taguchi DOE.

| | $C_{GG}$ (%) | $T_{max}$ (°C) | CR (°C/hr) |
|---|---|---|---|
| Low modulus | 1.5 | 340 | 12 |
| High modulus | 0.5 | 420 | 150 |

Note S4. Scanning Electron Microscopy Imaging: We imaged the microstructures of the PTFE inks and 3D-printed PTFE specimens using scanning electron microscopy (SEM) (FIG. 10). Samples were 3D-printed and exposed to the thermal treatment to obtain the high and low modulus PTFE cases determined from the DOE. We immersed the specimens in liquid nitrogen for 10 minutes and freeze-fractured the specimens for imaging.

Note S5. Fourier-transform infrared spectroscopy (FTIR) spectra of 3D-printed structures: We confirmed that the non-PTFE additives were removed during the thermal treatment using Fourier-transform infrared (FTIR) spectroscopy. We determined the FTIR spectra of commercially available PTFE tape as a control case, 3D-printed high and low modulus PTFE, pure GG and thermally treated GG (FIG.

11). We observed that spectra of the 3D-printed specimens and control PTFE exhibited the similar spectra and peaks around 1125 $cm^{-1}$.

Note S6. Mechanical properties of the 3D-printed PTFE specimens: We carried out quasistatic tensile tests on high and low modulus 3D-printed PTFE samples to determine their Young's modulus, yield strength, ultimate tensile strength and failure strain (FIG. 12).

Although the present disclosure has been described with respect to one or more particular example, it will be understood that other embodiments and/or examples of the present disclosure may be made without departing from the scope of the present disclosure.

What is claimed is:

1. A composition consisting of fluoropolymer particles, one or more media components, one or more surfactants, and one or more shear thinning agents, wherein the fluoropolymer particles are selected from polytetrafluoroethylene (PTFE) particles, perfluoroalkoxy particles, fluorinated ethylene-propylene particles, polyethylenetetrafluoroethylene particles, or a combination thereof, wherein the one or more media components are selected from water, ethylene glycol, methanol, ethanol, propanol, isopropanol, or any combination thereof, wherein the one or more surfactants are selected from: polyoxyethylene(12)nonylphenyl ether; polyoxyethylene(150)dinonylphenyl ether; Poly(oxy-1,2-ethanediyl), α-(nonylphenyl)-ω-hydroxy-; 2-[4-(2,4,4-trimethylpentan-2-yl)phenoxy]ethanol; ethoxylated acetylenic diols; or any combination thereof, and wherein the one or more shear thinning agents are selected from gellan gum, xanthan gum, agar, lithium sodium magnesium silicate, or any combination thereof.

2. The composition of claim 1, wherein the fluoropolymer particles are PTFE particles.

3. The composition of claim 1, wherein the composition comprises 20 to 50 wt % of the one or more media components, relative to the weight of the total composition.

4. The composition of claim 1, wherein the composition comprises 0.25-2.0 wt % shear thinning agent, relative to the weight of the total composition.

5. The composition of claim 1, wherein the fluoropolymer particles have a longest linear dimension of 10 nm to 100 microns.

6. The composition of claim 1, wherein the composition comprises 3 to 15 wt % of the one or more surfactant, relative to the weight of the total composition.

7. The composition of claim 1, wherein the composition is suitable for 3D printing.

8. A method of making the composition of claim 1, comprising:

heating the fluoropolymer particles, the one or more media components, and the one or more surfactants to produce a fluoropolymer medium dispersion;

mixing the one or more shear thinning agents with the fluoropolymer medium dispersion while stirring to form a mixture; and stirring the mixture to thereby make the composition.

9. The method of claim 8, wherein the heating does not exceed 50° C.

10. The method of claim 8, wherein the stirring is performed at approximately 500 to 4000 RPM, and wherein optionally the stirring is performed for approximately 30 seconds to 5 minutes, and wherein optionally the stirring is performed only once or twice, and wherein the stirring is performed optionally using a planetary mixer or by magnetic stirring.

11. A cartridge comprising a composition of claim 1.

12. A method of producing a three-dimensional structure using the composition of claim 1, comprising:

printing the three-dimensional structure using a 3D printer containing a cartridge comprising the composition.

13. The method of claim 12, wherein the 3D printer comprises a plastic or metal nozzle that is optionally an 18 G nozzle, and wherein the composition is dispensed through the nozzle.

14. The method of claim 13, wherein the composition is printed by the 3D printer by dispensing the composition at a pressure of 10-500 kPa, and/or wherein the composition is dispensed at a speed of 5 mm/s to 50 mm/s, and thermally treating the three-dimensional structure.

15. The method of claim 14, wherein the 3D printer comprises a plastic or metal nozzle that is optionally an 18 G nozzle, and wherein the composition is dispensed through the nozzle, and wherein the composition is dispensed at a pressure that is 10-500 kPa, and wherein the composition is dispensed at a speed of 5 mm/s to 50 mm/s, and thermally treating the three dimensional structure.

16. The method of claim 14, wherein the thermal treating comprises:

adjusting the interior temperature inside of a vessel containing the three-dimensional structure to a first temperature that is optionally 225° C. to 300° C. during a first period of time that is optionally 30 min to 10 hours;

maintaining the first temperature for a second period of time that is optionally 30 min-10 hours;

adjusting the interior temperature measured inside of the vessel containing the three-dimensional structure to a second temperature that is optionally 225-450° C. during a second period of time that is optionally 30 min to 10 hours;

maintaining the second temperature for a third period of time that is optionally 30 min-10 hours; and reducing the interior temperature inside of the vessel containing the three-dimensional structure to a third temperature during a fourth period of time that is optionally 30 min to 10 hours.

17. The method of claim 16, wherein any of the temperatures are adjusted at a rate of 1-200° C./hr.

18. An article of manufacture comprising polytetrafluoroethylene (PTFE), perfluoroalkoxy alkane, fluorinated ethylene-propylene, polyethylenetetrafluoroethylene, or a combination thereof, wherein the article of manufacture is produced according to claim 12.

19. The article of manufacture of claim 18, wherein the article of manufacture is a medical device or an aerospace component.

20. The article of manufacture of claim 19, wherein the medical device is an implantable medical device.

21. The article of manufacture of claim 20, wherein the implantable medical device comprises a vascular implantable medical device.

22. The article of manufacture of claim 21, wherein the vascular implantable medical device comprises a bicuspid aortic valve.

23. The composition of claim 1, wherein the shear thinning agent is gellan gum.

24. A composition consisting of fluoropolymer particles, one or more media components, one or more surfactants one or more shear thinning agents, and at least one additional particle, wherein the fluoropolymer particles are selected from polytetrafluoroethylene (PTFE) particles, perfluoroalkoxy particles, fluorinated ethylene-propylene particles, polyethylenetetrafluoroethylene particles, or a combination thereof, wherein the one or more media components are selected from water, ethylene glycol, methanol, ethanol, propanol, isopropanol, or any combination thereof, wherein the one or more surfactants are selected from: polyoxyethylene(12)nonylphenyl ether; polyoxyethylene(150)dinonylphenyl ether; Poly(oxy-1,2-ethanediyl), α-(nonylphenyl)-ω-hydroxy-; 2-[4-(2,4,4-trimethylpentan-2-yl)phenoxy]ethanol; ethoxylated acetylenic diols; or any combination thereof, wherein the one or more shear thinning agents are selected from gellan gum, xanthan gum, agar, lithium sodium magnesium silicate, or any combination thereof, and wherein the at least one additional particle is selected from magnetic particles, carbon nanotubes, carbon fibers, Kevlar fibers, glass fibers, bronze particles, silica nanoparticles, aluminum oxide, ceramic particles, iron oxide, graphene, graphene oxide flakes, or any combination thereof.

* * * * *